United States Patent
Fujita et al.

(10) Patent No.: US 11,535,916 B2
(45) Date of Patent: Dec. 27, 2022

(54) ALUMINUM-BASED PLATED STEEL SHEET, METHOD OF MANUFACTURING ALUMINUM-BASED PLATED STEEL SHEET, AND METHOD OF MANUFACTURING COMPONENT FOR VEHICLE

(71) Applicant: NIPPON STEEL CORPORATION, Tokyo (JP)

(72) Inventors: Soshi Fujita, Tokyo (JP); Yuki Suzuki, Tokyo (JP); Masahiro Fuda, Tokyo (JP); Jun Maki, Tokyo (JP); Hideaki Irikawa, Tokyo (JP); Takashi Aramaki, Tokyo (JP); Tatsuya Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/768,869

(22) PCT Filed: Dec. 5, 2018

(86) PCT No.: PCT/JP2018/044684
§ 371 (c)(1),
(2) Date: Jun. 1, 2020

(87) PCT Pub. No.: WO2019/111931
PCT Pub. Date: Jun. 13, 2019

(65) Prior Publication Data
US 2021/0164080 A1    Jun. 3, 2021

(30) Foreign Application Priority Data
Dec. 5, 2017   (JP) .............................. JP2017-233620

(51) Int. Cl.
*C22C 38/54* (2006.01)
*C21D 8/02* (2006.01)
(Continued)

(52) U.S. Cl.
CPC ............ *C22C 38/54* (2013.01); *C21D 8/0205* (2013.01); *C21D 8/0226* (2013.01);
(Continued)

(58) Field of Classification Search
CPC . C21D 1/18; C21D 1/673; C21D 1/76; C21D 9/46; C22C 38/001; C23C 28/02;
(Continued)

(56) References Cited

U.S. PATENT DOCUMENTS

2006/0292391 A1   12/2006  Ikematsu et al.
2016/0024610 A1    1/2016  Tanahashi et al.
(Continued)

FOREIGN PATENT DOCUMENTS

CN         1771344 A     5/2006
CN       105829578 A     8/2016
(Continued)

OTHER PUBLICATIONS

"Cosmetic corrosion test method for automotive parts", Japanese Automobile Standard, JASOM610-92 (Mar. 30, 1992), total of 12 pages.
(Continued)

*Primary Examiner* — Jie Yang
(74) *Attorney, Agent, or Firm* — Birch, Stewart, Kolasch & Birch, LLP

(57) ABSTRACT

An aluminum-based plated steel sheet according to an aspect of the present invention includes: a base material; an aluminum-based plating layer located above the base material; and an intermetallic compound layer that is located between the base material and the aluminum-based plating layer and contains an intermetallic compound of Al and Fe, in which the base material has a chemical component within a predetermined range, the aluminum-based plating layer contains, on average, 80 mass % or more and 97 mass % or less
(Continued)

of Al, 3 mass % or more and 15 mass % or less of Si, 0 mass % or more and 5 mass % or less of Zn, 0 mass % or more and 5 mass % or less of Fe, 0 mass % or more and 3 mass % or less in total of one or more selected from the group consisting of Mg and Ca, and impurities so that a total amount thereof is 100 mass %, an average value of a thickness of the intermetallic compound layer is 2 μm or more and 10 μm or less, a maximum value of the thickness of the intermetallic compound layer is 10 μm or more and 25 μm or less, and a standard deviation of the thickness of the intermetallic compound layer is 2 μm or more and 10 μm or less.

11 Claims, 3 Drawing Sheets

(51) Int. Cl.
| | |
|---|---|
| C21D 9/00 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/44 | (2006.01) |
| C22C 38/48 | (2006.01) |
| C22C 38/50 | (2006.01) |
| C23C 2/12 | (2006.01) |
| C23C 2/40 | (2006.01) |

(52) U.S. Cl.
CPC .......... *C21D 8/0236* (2013.01); *C21D 9/0081* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/44* (2013.01); *C22C 38/48* (2013.01); *C22C 38/50* (2013.01); *C23C 2/12* (2013.01); *C23C 2/40* (2013.01)

(58) Field of Classification Search
CPC ....... C23C 28/021; C23C 28/023; C23C 2/12; C23C 2/26
USPC ........................................................ 148/320
See application file for complete search history.

(56) References Cited

U.S. PATENT DOCUMENTS

| | | |
|---|---|---|
| 2016/0160309 A1 | 6/2016 | Allain et al. |
| 2016/0318093 A1 | 11/2016 | Maki et al. |
| 2016/0376679 A1* | 12/2016 | Kim .................. C21D 9/46 |
| | | 428/653 |
| 2017/0088914 A1 | 3/2017 | Ikeda |

FOREIGN PATENT DOCUMENTS

| | | |
|---|---|---|
| EP | 3 239 337 A1 | 11/2017 |
| EP | 3 239 338 A1 | 11/2017 |
| JP | 9-202953 A | 8/1997 |
| JP | 2003-49256 A | 2/2003 |
| JP | 2003-181549 A | 7/2003 |
| JP | 2010-18860 A | 1/2010 |
| JP | 2010-70800 A | 4/2010 |
| JP | 2016-532775 A | 10/2016 |
| JP | 2017-525849 A | 9/2017 |
| JP | 2017-532451 A | 11/2017 |
| WO | WO 2007/064172 A1 | 6/2007 |
| WO | WO 2010/005121 A1 | 1/2010 |
| WO | WO 2014/142238 A1 | 9/2014 |
| WO | WO 2015/098653 A1 | 7/2015 |

OTHER PUBLICATIONS

"Geometrical Product Specifications (GPS)—Surface texture Profile method—Terms, definitions and surface texture parameters", JIS B 0601 (2013), ISO4287, total of 83 pages.
"Hot-dip aluminium-coated steel sheet and strip", JIS G 3314 (2010), total of 90 pages.
"Sodium hydroxide (Reagent)", JIS K 8576 (2019), total of 72 pages.
International Search Report for PCT/JP2018/044684 (PCT/ISA/210) dated Jan. 15, 2019.
Office Action issued in TW Application No. 107143692 dated Mar. 10, 2020.
Written Opinion of the International Searching Authority for PCT/JP2018/044684 (PCT/ISA/237) dated Jan. 15, 2019.

* cited by examiner

| POSITION | [μm] |
|---|---|
| ① | 10.0 |
| ② | 16.7 |
| ③ | 11.7 |
| ④ | 10.0 |
| ⑤ | 6.5 |
| ⑥ | 3.3 |
| ⑦ | 4.8 |
| ⑧ | 5.0 |
| ⑨ | 9.2 |
| ⑩ | 13.3 |
| ⑪ | 5.0 |
| ⑫ | 5.0 |
| ⑬ | 5.0 |
| ⑭ | 6.7 |
| ⑮ | 3.3 |
| ⑯ | 6.5 |
| ⑰ | 7.5 |
| ⑱ | 3.3 |
| ⑲ | 3.3 |
| ⑳ | 5.0 |
| AVERAGE VALUE OF THICKNESS | 7 |
| MAXIMUM VALUE OF THICKNESS | 17 |
| STANDARD DEVIATION OF THICKNESS | 4 |

ALUMINUM-BASED PLATED STEEL SHEET, METHOD OF MANUFACTURING ALUMINUM-BASED PLATED STEEL SHEET, AND METHOD OF MANUFACTURING COMPONENT FOR VEHICLE

TECHNICAL FIELD OF THE INVENTION

The present invention relates to an aluminum-based plated steel sheet, a method of manufacturing an aluminum-based plated steel sheet, and a method of manufacturing a component for a vehicle.

Priority is claimed on Japanese Patent Application No. 2017-233620, filed on Dec. 5, 2017, the content of which is incorporated herein by reference.

RELATED ART

In recent years, a steel sheet having both high strength and high formability has been desired for applications of a steel sheet for a vehicle (for example, pillars of vehicles, door impact beams, and bumper beams). One example of the steel sheet having both high strength and high formability is a transformation induced plasticity (TRIP) steel utilizing martensitic transformation of residual austenite. With such TRIP steel, it is possible to manufacture a high strength steel sheet having excellent formability and a strength of about 1000 MPa grade. However, even in a case where the TRIP steel is used, it is difficult to secure formability while realizing higher strength (for example, ultrahigh strength such as 1500 MPa or more), and there is a problem that the shape fixability after forming is poor and the dimensional accuracy of the formed article is inferior.

Forming using TRIP steels as described above is performed by a forming method performed at around room temperature (so-called cold press method), while there is a hot stamping (also called hot pressing, hot press, diequenching, or press quenching) method as a method that has recently attracted attention. This hot stamping method is a method of manufacturing a component in which a steel sheet is subjected to hot pressing immediately after being heated to an austenite region of 800° C. or more so as to secure formability and is rapidly cooled with dies while the bottom dead point is held to quench the material, whereby a desired high strength material quality is realized after pressing. According to this method, it is possible to obtain a component for a vehicle having excellent shape fixability after forming.

The hot stamping method is promising as a method of forming an ultrahigh-strength member, but is generally considered to have two main problems. The first problem is a problem regarding scale during heating. Hot stamping usually has a heating a steel sheet in the air, and at the time of such heating, an oxide (scale) is generated on the surface of the steel sheet. Therefore, removing the scale is required, and the productivity is decreased. The second problem is a problem regarding a decrease in productivity with heating time. In the case of furnace heating in an electric furnace, a gas furnace, or the like, the average temperature rising rate when the temperature is raised from normal temperature to about 900° C. is usually 3 to 5° C./sec, so that it takes 180 to 290 seconds to start heating. Therefore, the number of components that can be formed by the hot stamping method is about 1 to 3 parts/min and is thus extremely low in productivity.

As a technique for improving the problem regarding scale that is the first problem and enhancing the corrosion resistance of a hot-stamping formed article, for example, Patent Documents 1 to 3 below propose techniques for suppressing the generation of scale during heating by using an aluminum-based plated steel sheet as a steel sheet for hot stamping.

In addition, in order to improve the second problem, that is, the problem of the decrease in productivity due to the heating time, as a technique for improving the heating efficiency of aluminum plating, for example, Patent Documents 4 and 5 below propose techniques focused on the fact that the temperature rising rate increases when an alloying reaction between Al and Fe that occurs during heating of aluminum plating reaches the surface.

More specifically, in Patent Document 4 below, the problem of the heating efficiency is solved by reducing the thickness of the plating layer of the aluminum plating.

In addition, in Patent Document 5 below, the problem of the heating efficiency is solved by holding a coil of an aluminum-based plated steel sheet in a box type annealing furnace at a temperature equal to or less than the melting point of aluminum plating before hot stamping for a certain period of time and alloying an alloying reaction between Al and Fe to proceed.

PRIOR ART DOCUMENT

Patent Document

[Patent Document 1] Japanese Unexamined Patent Application, First Publication No. H9-202953
[Patent Document 2] Japanese Unexamined Patent Application, First Publication No. 2003-181549
[Patent Document 3] Japanese Unexamined Patent Application, First Publication No. 2003-49256
[Patent Document 4] Japanese Unexamined Patent Application, First Publication No. 2010-70800
[Patent Document 5] Japanese Patent Application No. 2010-519842

DISCLOSURE OF THE INVENTION

Problems to be Solved by the Invention

As described above, aluminum-based plated steel sheets are promising as a material that solves the problem of scale during hot stamping and also has corrosion resistance.

However, in the techniques disclosed in Patent Documents 1 to 3, although a scale removing is omitted by suppressing the generation of scale during heating, which is the first problem, and the productivity can be improved, the problem of the decrease in productivity caused by the heating time, that is the second problem, cannot be solved.

In the technique disclosed in Patent Document 4, although the problem of the decrease in productivity caused by the heating time, that is the second problem, can be solved, the suppression of scale, that is the first problem, is insufficiently achieved, and as a result, there is a need to provide a scale removing and the productivity decreases. Furthermore, since the thickness of the plating layer is reduced, there is a problem that the corrosion resistance is reduced.

Furthermore, in the technique disclosed in Patent Document 5, although the heating time in the hot stamping can be shortened, preheating the coil of the aluminum-based plated steel sheet in the box type annealing furnace is added, resulting an increase in the number of manufacturing processes. An Al—Fe-based intermetallic compound formed by the alloying reaction between Al and Fe generally has high hardness. For this reason, there is a problem that at a point subjected to elongation or bending at the time of skin pass rolling or coiling or at a point subjected to work such as an end surface during blank cutting before hot stamping, the plating is peeled off and the corrosion resistance is reduced.

As described above, there is a demand for an aluminum-based plated steel sheet capable of further improving productivity caused by a heating time of a hot stamping method without increasing the number of manufacturing processes, while realizing excellent corrosion resistance.

Therefore, the present invention has been made in view of such a problem, and an object thereof is to provide an aluminum-based plated steel sheet, a method of manufacturing an aluminum-based plated steel sheet, and a method of manufacturing a component for a vehicle, capable of further improving productivity caused by a heating time of a hot stamping method without increasing the number of manufacturing processes, while realizing excellent corrosion resistance.

Means for Solving the Problems

The gist of the present invention is as follows.

(1) An aluminum-based plated steel sheet according to an aspect of the present invention includes: a base material; an aluminum-based plating layer located above the base material; and an intermetallic compound layer that is located between the base material and the aluminum-based plating layer and contains an intermetallic compound of Al and Fe, in which the base material contains, by mass %, C: 0.15% or more and 0.50% or less, Si: 0.010% or more and 2.000% or less, Mn: 0.3% or more and 5.0% or less, Cr: 0.010% or more and 2.000% or less, P: 0.1% or less, S: 0.1% or less, Al: 0.5% or less, B: 0.0002% or more and 0.0100% or less, N: 0% or more and 0.01% or less, W: 0% or more and 3% or less, Mo: 0% or more and 3% or less, V: 0% or more and 2% or less, Ti: 0% or more and 0.5% or less, Nb: 0% or more and 1% or less, Ni: 0% or more and 5% or less, Cu: 0% or more and 3% or less, Sn: 0% or more and 0.1% or less, Sb: 0% or more and 0.1% or less, and a remainder including Fe and impurities, the aluminum-based plating layer contains, on average, 80 mass % or more and 97 mass % or less of Al, 3 mass % or more and 15 mass % or less of Si, 0 mass % or more and 5 mass % or less of Zn, 0 mass % or more and 5 mass % or less of Fe, 0 mass % or more and 3 mass % or less in total of one or more selected from the group consisting of Mg and Ca, and impurities so that a total amount thereof is 100 mass %, an average value of a thickness of the intermetallic compound layer is 2 μm or more and 10 μm or less, a maximum value of the thickness of the intermetallic compound layer is 10 μm or more and 25 μm or less, and a standard deviation of the thickness of the intermetallic compound layer is 2 μm or more and 10 μm or less.

(2) The aluminum-based plated steel sheet according to (1) may further include: an oxide-containing region containing one or more selected from the group consisting of a Si oxide, a Mn oxide, a Cr oxide, and a B oxide in a total amount of 1 mass % or more and 10 mass % or less in a range of 5 μm from an interface between the base material and the intermetallic compound layer in a direction toward a center of the base material.

(3) In the aluminum-based plated steel sheet according to (1) or (2), the aluminum-based plating layer may contain one or more selected from the group consisting of Mg and Ca in a total amount of 0.01 mass % or more and 3 mass % or less.

(4) A method of manufacturing an aluminum-based plated steel sheet according to another aspect of the present invention is a method of manufacturing the aluminum-based plated steel sheet according to any one of (1) to (3), the method including: hot rolling a steel slab to obtain a hot-rolled steel sheet; coiling the hot-rolled steel sheet; pickling the hot-rolled steel sheet; cold rolling the hot-rolled steel sheet to obtain a cold rolled steel sheet; and continuously performing an annealing treatment and a hot dip aluminum-based plating treatment on the cold rolled steel sheet, in which the steel slab contains, by mass %, C: 0.15% or more and 0.50% or less, Si: 0.010% or more and 2.000% or less, Mn: 0.3% or more and 5.0% or less, Cr: 0.010% or more and 2.000% or less, P: 0.1% or less, S: 0.1% or less, Al: 0.5% or less, B: 0.0002% or more and 0.0100% or less, N: 0% or more and 0.01% or less, W: 0% or more and 3% or less, Mo: 0% or more and 3% or less, V: 0% or more and 2% or less, Ti: 0% or more and 0.5% or less, Nb: 0% or more and 1% or less, Ni: 0% or more and 5% or less, Cu: 0% or more and 3% or less, Sn: 0% or more and 0.1% or less, Sb: 0% or more and 0.1% or less, and a remainder including Fe and impurities, a steel sheet coiling temperature CT during the coiling is set to 700° C. or more and 850° C. or less, an arithmetic average roughness Ra of a surface of the cold rolled steel sheet after the cold rolling is set to 0.5 μm or more and 5 μm or less, and a plating bath in the hot dip aluminum-based plating treatment contains 80 mass % or more and 97 mass % or less of Al, 3 mass % or more and 15 mass % or less of Si, impurities, 0 mass % or more and 5 mass % or less of Zn, 0 mass % or more and 5 mass % or less of Fe, and 0 mass % or more and 3 mass % or less in total of one or more selected from the group consisting of Mg and Ca so that a total amount thereof is 100 mass %.

(5) In the method of manufacturing the aluminum-based plated steel sheet according to (4), in the annealing treatment, a value of a relational expression log $(P_{H12O}/P_{H112})$ between a water vapor partial pressure $P_{H112O}$ and a hydrogen partial pressure $P_{H2}$ in an annealing atmosphere in a sheet temperature range of 650° C. or more and 900° C. or less may be set to −3 or more and −0.5 or less, and an annealing time at the sheet temperature may be set to 60 seconds or more and 500 seconds or less.

(6) In the method of manufacturing the aluminum-based plated steel sheet according to (4) or (5), the plating bath may contain one or more selected from the group consisting of Mg and Ca in a total amount of 0.01 mass % or more and 3 mass % or less.

(7) A method of manufacturing a component for a vehicle according to another aspect of the present invention, includes: heating the aluminum-based plated steel sheet according to any one of (1) to (3) to 850° C. or more; press forming the aluminum-based plated steel sheet with a die; and rapidly cooling the aluminum-based plated steel sheet with the die at a cooling rate of 30° C./s or more.

Effects of the Invention

According to the present invention, it is possible to provide an aluminum-based plated steel sheet, a method of manufacturing an aluminum-based plated steel sheet, and a method of manufacturing a component for a vehicle, capable of further improving productivity caused by a heating time of a hot stamping method without increasing the number of manufacturing processes, while realizing excellent corrosion resistance.

EMBODIMENTS OF THE INVENTION

Figure 1:
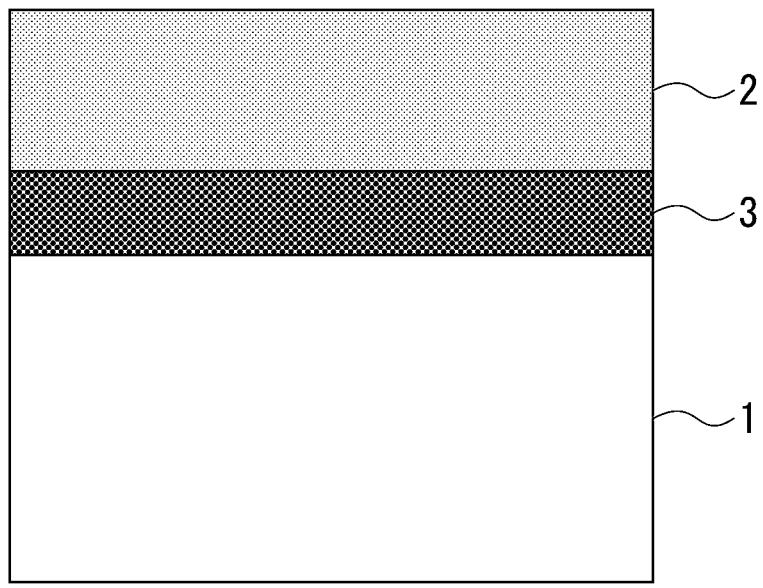
FIG. 1 is a schematic view illustrating an example of a configuration of an aluminum-based plated steel sheet according to an embodiment of the present invention.

The present inventors intensively studied to solve the above problems. The present inventors paid attention to the temperature rising rate during heating as a factor inhibiting the heating efficiency of aluminum-based plating. As a result, it was found that the temperature rising rate was particularly slow from room temperature to about 750° C., whereas the temperature rising rate was faster at 750° C. or more. Although the cause of such a phenomenon is not clear, it is presumed as follows because the temperature at which the temperature rising rate changes is a value substantially close to 660° C., which is the melting point of metal Al. That is, it is considered that in addition to the fact that Al originally has a low emissivity, in a temperature range from the melting point of plating to 750° C., Al melts and the plating surface becomes smooth, resulting in a further decrease in the emissivity. On the other hand, it is considered that in a temperature range of 750° C. or more, an alloying reaction between Al and Fe is promoted, an intermetallic compound of Al and Fe is thus formed up to the surface of the aluminum-based plating, and as a result, the emissivity is improved and heat absorption is improved. As described later, the term "intermetallic compound of Al and Fe" is a concept including not only Fe—Al-based intermetallic compounds, but also intermetallic compounds containing elements other than Fe and Al, such as Fe—Al—Si-based intermetallic compounds.

As a fact that suggests that the emissivity is improved when an intermetallic compound of Al and Fe is formed, the following phenomenon is described. Regarding the surface external appearance of aluminum-based plating, the external appearance before heating is silver-white with metallic luster, whereas when the intermetallic compound of Al and Fe is formed up to the surface of aluminum-based plating, the external appearance changes to a blackish color and the metallic luster disappears.

Based on the above findings, the present inventors thought that it is effective to improve the temperature rising rate of a steel sheet during hot stamping and increase the heating efficiency by forming a large amount of an intermetallic compound of Al and Fe in aluminum-based plating before the hot stamping and allowing an alloying reaction of Al and Fe to proceed up to the surface of the aluminum-based coating within a short period of time. Here, in a Sendzimir type hot dip aluminum plating method, which is one of hot dip aluminum plating methods, an intermetallic compound layer of Al and Fe can be formed at the interface between an aluminum-based plating layer and a base material. Therefore, it was thought that a large amount of the intermetallic compound layer containing the intermetallic compound of Al and Fe as described above can be formed before the hot stamp heating by using the Sendzimir type hot dip aluminum-based plating method.

On the other hand, since the intermetallic compound of Al and Fe is full hard, when a large amount of the intermetallic compound of Al and Fe is formed, the intermetallic compound layer is easily fractured, and a problem occurs in plating adhesion. Therefore, the present inventors further studied a solution to this problem. As a result, it was found that regarding the thickness of the intermetallic compound layer containing the intermetallic compound of Al and Fe, by suppressing an excessive increase in the overall thickness and locally forming thick portions in a constant proportion, the plating adhesion of an aluminum-based plated steel sheet before hot stamping is secured and the alloying reaction between Al and Fe can be allowed to proceed up to the surface of the aluminum-based plating within a short period of time. Thereby, the problem of plating adhesion can be solved and furthermore, the heating efficiency can be promoted.

In general, as the sheet thickness of the steel sheet decreases, the heating rate during heating in hot stamping increases, and the heating efficiency increases. Similarly, as the thickness of the aluminum-based plating layer decreases, the alloying time of plating (the time until the surface turns black with no metallic luster and the heat absorption efficiency is improved) decreases, so that the heating efficiency during hot stamping is improved. Here, "excellent heating efficiency" mentioned in the present embodiment indicates that a steel sheet having an aluminum-based plating layer of the same temperature condition, the same sheet thickness, and the same thickness has better heating efficiency than the technology in the related art.

Hereinafter, preferred embodiments of the present invention completed based on such knowledge will be described in detail with reference to the accompanying drawings. In the specification and the drawings, constituent elements having substantially the same functional configuration are denoted by the same reference numerals, and redundant description is omitted.

As briefly mentioned earlier, aluminum-based plated steel sheets are promising as a material that solves the problem of scale during hot stamping and also has corrosion resistance. There is a demand for an aluminum-based plated steel sheet in which the thickness of an aluminum-based plating layer is secured against a reduction in productivity caused by low heating efficiency during hot stamping, and thus the number of manufacturing processes of the steel sheet is not increased while the heating efficiency during hot stamping is increased.

In view of the above point, embodiments of the present invention described below in detail relate to a hot dip aluminum-based plated steel sheet for hot stamping and a method of manufacturing the same, and a method of manufacturing a component for a vehicle, and particularly, to an aluminum-based plated steel sheet that achieves excellent heating efficiency during hot stamping and a method of manufacturing the same.

[Aluminum-Based Plated Steel Sheet]

<Overall Structure of Aluminum-Based Plated Steel Sheet>

Figure 2:
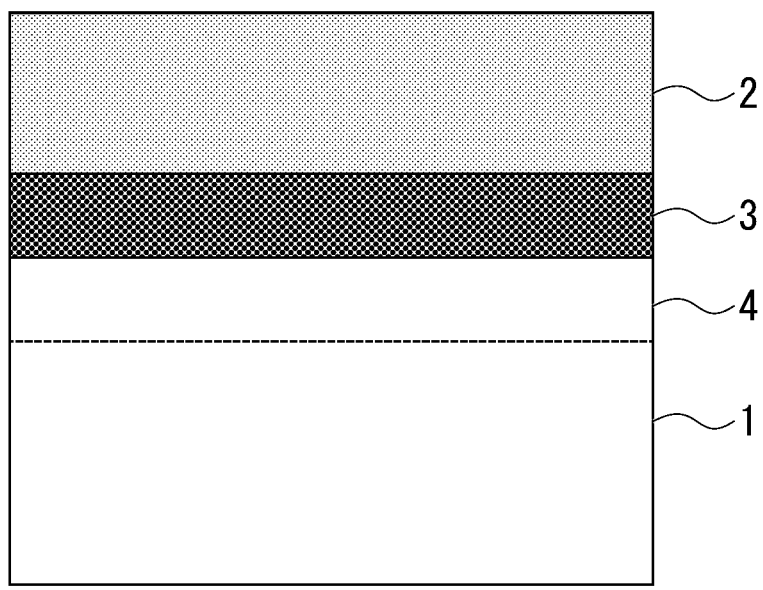
FIG. 2 is a schematic view showing another configuration example of the aluminum-based plated steel sheet according to the embodiment.

Hereinafter, the overall structure of the aluminum-based plated steel sheet according to the present embodiment will be described with reference to FIGS. 1 and 2. FIG. 1 is a schematic view illustrating an example of an aluminum-based plated steel sheet according to the embodiment of the present invention, and illustrates a cross section of the aluminum-based plated steel sheet cut in a thickness direction. FIG. 2 is a schematic view illustrating another configuration example of the aluminum-based plated steel sheet of the present embodiment.

As illustrated in FIG. 1, the aluminum-based plated steel sheet according to the present embodiment has a base material 1, an aluminum-based plating layer 2 located above one surface of the base material 1, and an intermetallic compound layer 3 located between the base material 1 and the aluminum-based plating layer. As illustrated in FIG. 2, the aluminum-based plated steel sheet according to the present embodiment includes the aluminum-based plating layer 2 located above one surface of the base material 1 and the intermetallic compound layer 3 located between the base material 1 and the aluminum-based plating layer 2, and preferably has an oxide-containing region 4 inside the base material 1 near the interface between the base material 1 and the intermetallic compound layer 3.

FIGS. 1 and 2 illustrate the case where the aluminum-based plating layer 2, the intermetallic compound layer 3, and the oxide-containing region 4 are present on one surface of the base material. However, the aluminum-based plating layer 2, the intermetallic compound layer 3, and the oxide-containing region 4 as described above may be present on both surfaces of the base material.

<Base Material 1>

Hereinafter, first, the base material 1 of the aluminum-based plated steel sheet according to the present embodiment will be described in detail.

Since a hot stamping method is a method of simultaneously performing press working and quenching with dies, the chemical composition of the base material 1 of the aluminum-based plated steel sheet according to the present embodiment may be a chemical composition having good hardenability. Hereinafter, the chemical composition of the base material according to the present embodiment will be described in detail. In the following description, "%" regarding the composition means "mass %" unless otherwise specified.

From the above viewpoints, the chemical composition of the base material 1 according to the present embodiment includes, by mass %, C: 0.15% or more and 0.5% or less, Si: 0.01% or more and 2.0% or less, Mn: 0.3% or more and 5.0% or less, Cr: 0.01% or more and 2.0% or less, P: 0.1% or less, S: 0.1% or less, Al: 0.5% or less, B: 0.0002% or more and 0.01% or less, and a remainder including Fe and impurities. In addition, the chemical composition of the base material 1 according to the present embodiment may optionally contain, by mass %, one or more selected from the group consisting of N: 0% or more and 0.01% or less, W: 0% or more and 3% or less, Mo: 0% or more and 3% or less, V: 0% or more and 2% or less, Ti: 0% or more and 0.5% or less, Nb: 0% or more and 1% or less, Ni: 0% or more and 5% or less, Cu: 0% or more and 3% or less, Sn: 0% or more and 0.1% or less, and Sb: 0% or more and 0.1% or less.

(C: 0.15% or More and 0.50% or Less)

A formed article obtained by the hot stamping method according to the present embodiment needs to have a high strength of, for example, 1000 MPa or more, and the structure of the formed article needs to be transformed into a microstructure primarily containing martensite by being rapidly cooled after hot stamping. When the carbon (C) content is less than 0.15%, the hardenability decreases and the strength becomes insufficient. On the other hand, when the C content exceeds 0.50%, a decrease in the toughness of the steel sheet becomes significant, and the workability decreases. Therefore, the C content is set to 0.15% or more and 0.50% or less. The C content is preferably 0.20% or more, 0.25% or more, or 0.28% or more. The C content is preferably 0.40% or less, 0.35% or less, or 0.30% or less.

(Si: 0.010% or More and 2.000% or Less)

In a case where the silicon (Si) content is less than 0.010%, hardenability and fatigue properties are poor. On the other hand, since Si is an element (easily oxidizable element) that is more easily oxidized than Fe, when the Si content exceeds 2.000% in a continuous annealing plating line, a stable Si-based oxide film is formed on the surface of a steel sheet during an annealing treatment, which impairs the adhesion of hot dip Al plating and causes non-plating. Therefore, the Si content is set to 0.010% or more and 2.000% or less. The Si content is preferably 0.050% or more, 0.100% or more, or 0.300% or more. The Si content is preferably 1.000% or less, 0.800% or less, or 0.600% or less.

(Mn: 0.3% or More and 5.0% or Less)

Manganese (Mn) is an element that enhances the hardenability of the steel sheet and can further suppress hot embrittlement due to S that can be incorporated into the steel sheet. In a case where the Mn content is less than 0.3%, the hardenability decreases and the strength becomes insufficient. On the other hand, in a case where the Mn content exceeds 5.0%, impact characteristics after quenching deteriorate. Therefore, the Mn content is set to 0.3% or more and 5.0% or less. The Mn content is preferably 0.5% or more, 0.8% or more, or 1.0% or more. The Mn content is preferably 4.0% or less, 3.0% or less, or 2.0% or less.

(Cr: 0.010% to 2.000%)

Chromium (Cr) is an element exhibiting an effect of improving the hardenability of a steel sheet. However, in a case where the Cr content is less than 0.010%, the effect of improving the hardenability as described above cannot be obtained, resulting in insufficient strength. On the other hand, since Cr is an element (easily oxidizable element) that is more easily oxidized than Fe, in a case where the Cr content exceeds 2.000% in a continuous annealing plating line, a stable Cr-based oxide film is formed on the surface of a steel sheet during an annealing treatment, which impairs the adhesion of hot dip Al plating and causes non-plating. Therefore, the Cr content is set to 0.010% or more and 2.000% or less. The Cr content is preferably 0.100% or more, 0.400% or more, or 0.800% or more. The Cr content is preferably 1.600% or less, 1.400% or less, or 1.000% or less.

(P: 0.1% or Less)

Phosphorus (P) is also a solid solution strengthening element, and can increase the strength of a steel sheet relatively inexpensively. Here, in a case where the P content exceeds 0.1%, adverse effects such as a decrease in toughness are incurred, so that the P content is set to 0.1% or less. On the other hand, since P is not required in the aluminum-based plated steel sheet according to the present embodiment, the lower limit of the P content is not particularly limited and may be 0%. A case where the P content is set to less than 0.001% is not economical from the refining limit, so that the P content may be set to 0.001% or more. The P content is preferably 0.05% or less, and more preferably 0.01% or less or 0.005% or less.

(S: 0.1% or Less)

Sulfur (S) becomes inclusions in steel as MnS. Here, in a case where the S content exceeds 0.1%, MnS becomes a fracture origin, ductility and toughness decrease, and workability decreases. Therefore, the S content is set to 0.1% or less. On the other hand, since S is not required in the aluminum-based plated steel sheet according to the present embodiment, the lower limit of the S content is not particularly limited and may be 0%. A case where the S content is set to less than 0.001% is not economical from the refining limit, so that the S content may be set to 0.001% or more. The S content is preferably 0.05% or less, and more preferably 0.01% or less or 0.005% or less.

(Al: 0.5% or Less)

Aluminum (Al) is contained in steel as a deoxidizing agent. Since Al is an element that is more easily oxidized than Fe, in a case where the Al content exceeds 0.5%, a stable Al-based oxide film is formed on the surface of a steel sheet during an annealing treatment, which impairs the adhesion of hot dip Al plating and causes non-plating. Therefore, the Al content is set to 0.5% or less. On the other hand, the lower limit of the Al content is not particularly limited, and may be 0%. A case where the Al content is set to less than 0.01% is not economical from the refining limit, so that the Al content may be set to 0.01% or more. The Al content is preferably 0.2% or less, and more preferably 0.1% or less or 0.08% or less.

(B: 0.0002% or More and 0.0100% or Less)

Boron (B) is a useful element from the viewpoint of hardenability, and containing 0.0002% or more of B improves the hardenability. However, in a case where B is contained in an amount of more than 0.0100%, the effect of improving the hardenability is saturated. Furthermore, when B is excessively contained, the manufacturability is lowered, for example, a casting defect or a crack during hot rolling is generated. Therefore, the B content is set to 0.0002% or more and 0.0100% or less. The B content is preferably 0.0010% or more, 0.0020% or more, or 0.0030% or more. The B content is preferably 0.0080% or less, 0.0070% or less, or 0.0060% or less.

Subsequently, elements that can be selectively contained in the base material 1 will be described below in detail. However, the aluminum-based plated steel sheet according to the present embodiment can solve the problem without using optional elements of the base material 1 described below. Therefore, the lower limits of the amounts of the optional elements of the base material 1 are all 0%.

(N: 0% or More and 0.01% or Less)

Nitrogen (N) is desirably fixed from the viewpoint of stabilizing characteristics, and can be fixed using Ti, Nb, Al, or the like. When the N content increases, the amount of elements to be contained for fixing N increases, which leads to an increase in cost. Therefore, the N content is preferably 0.01% or less. The N content is more preferably 0.008% or less.

(W and Mo: Each 0% or More and 3% or Less)

Tungsten (W) and molybdenum (Mo) are each useful elements from the viewpoint of hardenability, and exhibit an effect of improving hardenability by being contained in an amount of 0.01% or more. On the other hand, in a case where the W and Mo contents each exceed 3%, the above effect is saturated and the cost increases. Therefore, the W and Mo contents are each preferably set to 0.01% or more and 3% or less. The W and Mo contents are each more preferably 0.05% or more. The W and Mo contents are each more preferably 1% or less.

(V: 0% or More and 2% or Less)

Vanadium (V) is a useful element from the viewpoint of hardenability, and exhibits an effect of improving hardenability by being contained in an amount of 0.01% or more. However, in a case where V is contained in an amount of more than 2%, such an effect is saturated and the cost increases. Therefore, the V content is preferably set to 0.01% or more and 2% or less. The V content is more preferably 0.05% or more. The V content is more preferably 1% or less.

(Ti: 0% or More and 0.5% or Less)

Titanium (Ti) can be contained from the viewpoint of fixing N, and is preferably contained in a mass % of about 3.4 times the N content. Even if the N content is reduced, the N content is often about 10 ppm (0.001%). Therefore, the Ti content is preferably 0.005% or more. On the other hand, in a case where Ti is excessively contained, the hardenability decreases and results in a decrease in the strength. Such a decrease in hardenability and strength becomes significant when the Ti content exceeds 0.5%. Therefore, the upper limit of the Ti content is preferably set to 0.5%. The Ti content is more preferably 0.01% or more. The Ti content is more preferably 0.1% or less.

(Nb: 0% or More and 1% or Less)

Niobium (Nb) can be contained from the viewpoint of fixing N, and is preferably contained in a mass % of about 6.6 times the N content. Even if the N content is reduced, the N content is often about 10 ppm (0.001%). Therefore, the Nb content is preferably 0.01% or more. On the other hand, in a case where Nb is excessively contained, the hardenability decreases and results in a decrease in the strength. Such a decrease in hardenability and strength becomes significant when the Nb content exceeds 1%. Therefore, the upper limit of the Nb content is preferably set to 1%. The Nb content is more preferably 0.02% or more. The Nb content is more preferably 0.1% or less.

Furthermore, even if Ni, Cu, Sn, Sb, or the like is contained in the chemical composition of the base material 1, the effect of the present invention is not impaired.

(Ni: 0% or More and 5% or Less)

Nickel (Ni) is a useful element from the viewpoint of low temperature toughness leading to improvement in impact resistance in addition to hardenability, and exhibits such an effect by being contained in an amount of 0.01% or more. However, even if Ni is contained in an amount of more than 5%, the above-mentioned effect is saturated and the cost increases. Therefore, Ni may be contained in a range of 0.01% or more and 5% or less.

(Cu: 0% or More and 3% or Less)

Copper (Cu) is a useful element from the viewpoint of toughness in addition to hardenability, and exhibits such an effect by being contained in an amount of 0.01% or more. However, even if Cu is contained in an amount of more than 3%, the above-mentioned effect is saturated and the cost increases. Furthermore, excessive Cu causes deterioration of cast piece properties and cracking and generation of flaws during hot rolling. Therefore, Cu may be contained in a range of 0.01% or more and 3% or less.

(Sn and Sb: Each 0% or More and 0.1% or Less)

Both tin (Sn) and antimony (Sb) are effective elements for improving the wettability and adhesion of the plating, and the above-mentioned effect is exhibited by including at least one of Sn and Sb in an amount of 0.005% or more. On the other hand, in a case where at least one of Sn and Sb is contained in an amount of more than 0.1%, defects are likely to occur during manufacturing, and a decrease in toughness is incurred. Therefore, the amount of at least one of Sn and Sb is preferably 0.1% or less.

(Other Elements)

Other elements are not particularly specified, but elements such as Zr and As may be incorporated from scrap. However, when the amount thereof incorporated is in a normal range, the characteristics of the base material 1 according to the present embodiment are not affected.

The remainder of the chemical composition of the base material 1 includes iron and impurities. Impurities are elements that are incorporated from raw materials such as ore or scrap or due to various factors of manufacturing processes when steel is industrially manufactured, and mean elements that are acceptable within the range that does not have an adverse effect on the aluminum-based plated steel sheet according to the present embodiment.

As above, the base material 1 included in the aluminum-based plated steel sheet according to the present embodiment has been described in detail.

<Aluminum-Based Plating Layer 2>

Aluminum-based plating means aluminum plating and alloy plating containing aluminum as a primary component. The aluminum-based plating layer 2 is a plating layer that is made of aluminum-based plating and does not contain an intermetallic compound of Al and Fe. In the aluminum-based plated steel sheet according to the present embodiment, the aluminum-based plating layer 2 is a layer containing, on average, 80 mass % or more and 97% or less of Al, 3 mass % or more and 15% or less of Si, and impurities so that the total amount thereof is 100%. The aluminum-based plating layer 2 may contain, in addition to the Al and Fe, on average, 0 mass % or more and 5 mass % or less of Zn, 0 mass % or more and 5 mass % or less of Fe, and 0 mass % or more and 3 mass % or less in total of one or more selected from the group consisting of Mg and Ca under the condition that the total amount thereof is 100%. Hereinafter, the aluminum-based plating layer 2 will be described in detail. The concentration distribution of the chemical composition of the aluminum-based plating layer 2 according to the present embodiment is generally inclined in the thickness direction, but in the present embodiment, the chemical composition is defined by an average value. Hereinafter, unless otherwise specified, the values indicating the chemical composition of the aluminum-based plating layer 2 are average values in the entire aluminum-based plating layer 2.

(Method of Forming Aluminum-Based Plating Layer 2)

The aluminum-based plating layer 2 is formed for the purpose of suppressing the generation of oxide scale on the base material during heating in hot stamping and suppressing corrosion after press forming. Examples of a method of forming the aluminum-based plating layer 2 include various forming methods such as a hot dip plating method, an electro plating method, a vacuum deposition method, and a cladding method. At present, the most common plating method due to its low industrial cost is a hot dip plating method, and such a hot dip plating method is preferably used for forming the aluminum-based plating layer 2. Hereinafter, the aluminum-based plating layer 2 according to the present embodiment will be described in detail using a hot dip plating method as an example.

(Al: 80% or More and 97% or Less)

The aluminum-based plating layer 2 according to the present embodiment contains 80% or more of Al. Al has a melting point of 660° C. and a boiling point of 2470° C., which are higher than the melting point and boiling point of zinc (Zn: melting point 419.5° C., boiling point 907° C.) that is a representative of other plating kinds, and the melting point of Sn (melting point of 231.9° C., boiling point 2603° C.). Therefore, from the viewpoint of suppression of the generation of oxide scale on the base material and suppression of contamination due to adhesion of plating components to facilities in during heating, which are required for plating on steel material used for hot stamping including heating before pressing, aluminum-based plating is superior to Zn plating and Sn plating. In addition, since press forming is performed at a high temperature immediately after the heating in the hot stamping, Al-based plating is also excellent as plating on steel material for hot stamping even from the viewpoint of suppressing liquid metal embrittlement (LME) that occurs in a Zn plating treatment. The Al content in the aluminum-based plating layer 3 is set to 80% or more from the viewpoint of suppressing the generation of oxide scale on the base material, suppressing the contamination of facilities, and suppressing LME. Furthermore, as will be described later, since the Si content in the aluminum-based plating layer 2 according to the present embodiment is 3% or more, the upper limit of the Al content in the aluminum-based plating layer 3 is 97%. Therefore, in the aluminum-based plating layer 2 according to the present embodiment, the Al content is 80% or more and 97% or less. The Al content is preferably 82% or more, 84% or more, or 86% or more. The Al content is preferably 95% or less, 93% or less, or 90% or less.

(Si: 3% or More and 15% or Less)

The aluminum-based plating layer 2 according to the present embodiment further contains 3% or more and 15% or less of Si as an element other than Al. By including molten Si in a plating solution in the hot dip plating method, the thickness of the intermetallic compound layer 3 containing an intermetallic compound of Al and Fe generated during the aluminum-based plating treatment can be controlled. In a case where the Si content is less than 3 mass %, the intermetallic compound layer 3 grows thick in a stage where Al plating is performed, and promotes cracking of the plating layer during work, so that there is a possibility that corrosion resistance may be adversely affected. On the other hand, in a case where the Si content exceeds 15 mass %, the thickness of the Al—Fe intermetallic compound layer is excessively suppressed, and there is a possibility that the heating efficiency during hot stamping may be reduced. Therefore, the Si content is 3 mass % or more and 15 mass % or less. The Si content is preferably 5 mass % or more, 7 mass % or more, or 8 mass % or more. The Si content is preferably 13 mass % or less, 11 mass % or less, or 10 mass % or less.

(Zn: 5% or Less)

When Zn is contained in the aluminum-based plating layer 2, there is a possibility that LME may be generated as described above. Therefore, from the viewpoint of suppressing LME, the Zn content is preferably 5 mass % or less, 4 mass % or less, or 3 mass % or less. Since Zn is not required in the aluminum-based plating layer 2 of the aluminum-based plated steel sheet according to the present embodiment, Zn need not be contained in the aluminum-based plating layer 2. That is, the Zn content of the aluminum-based plating layer 2 may be 0 mass %.

(Fe: 5% or Less)

In a case where the aluminum-based plating layer 2 is formed using the hot dip plating method, 2 to 4 mass % of Fe eluted from equipment or a steel strip in a bath may be contained in the aluminum-based plating layer 2. In the aluminum-based plating layer 2, 2 to 4 mass % of Fe is allowed. On the other hand, when the Fe content exceeds 5%, cracks occur in the aluminum-based plating layer 2 during coiling, so that the generation of Fe oxide scale during heating in the hot stamping may not be sufficiently suppressed. Therefore, the Fe content in the aluminum-based plating layer 2 is preferably 5% or less. On the other hand, Fe is not required in the aluminum-based plating layer 2 of the aluminum-based plated steel sheet according to the present embodiment, so that Fe need not be contained in the aluminum-based plating layer 2. That is, the Fe content of the aluminum-based plating layer 2 may be 0 mass %.

Elements other than Fe that may be eluted from the equipment or steel strip in the bath include Cr, Mo, V, W, Mn, and the like. These elements may also be contained as impurities in the aluminum-based plating layer 2 within the range that does not adversely affect the characteristics of the aluminum-based plated steel sheet according to the present embodiment.

The aluminum-based plating layer 2 according to the present embodiment can further contain at least one of magnesium (Mg), calcium (Ca), strontium (Sr), and lithium (Li). Since these elements are not essential in the aluminum-based plating layer 2, the amounts thereof may be 0%. On the other hand, particularly, Mg and Ca can increase the emissivity of the surface of the aluminum-based plating layer 2 and improve the efficiency of heat absorption. According to the Ellingham diagram, Mg and Ca are more easily oxidizable elements than Al. Therefore, by including at least one of Mg and Ca in a total amount of 0.01% or more, the oxidation resistance of plating during heating in the hot stamping is improved, and the corrosion resistance after the hot stamping can be further improved. Furthermore, Mg and Ca-based oxides formed during heating in the hot stamping improve the emissivity of the surface of the aluminum-based plating layer 2, increase the heat absorption efficiency, and improve the heating efficiency during hot stamping. On the other hand, when at least one of Mg and Ca exceeds 3% in total, oxidizing properties are excessively increased and an oxide film is formed in a plating bath during hot dip plating, which leads to the deterioration of the plating external appearance after the treatment and the occurrence of non-plating. Therefore, the aluminum-based plating layer 2 according to the present embodiment preferably contains at least one of Mg and Ca in a total amount of 0.01% or more and 3% or less. The total amount of at least one of Mg and Ca is more preferably 0.05% or more. The total amount of at least one of Mg and Ca is more preferably 1% or less.

The chemical composition of the aluminum-based plating layer 2 according to the present embodiment contains Al, Si, Zn, Fe, Mg, Ca, Sr, Li, and impurities so that the total amount thereof is 100 mass %. The impurities are, for example, elements eluted from the equipment in the bath, alloying elements eluted from the base steel sheet, and elements incorporated in the raw material of the plating bath, and are elements that are acceptable within the range that does not adversely affect the characteristics of the aluminum-based plated steel sheet according to the present embodiment.

(Composition Analysis Method)

As a method of specifying the composition of the aluminum-based plating layer 2, there is a method of dissolving the plating layer and quantitatively analyzing the solution using inductively coupled plasma (ICP)-atomic emission spectrometry. Examples of a method of dissolving the aluminum-based plating layer 2 include a method of immersing the aluminum-based plating layer 2 in an aqueous sodium hydroxide solution. More specifically, as described in JIS G 3314:2011, an aqueous solution prepared by dissolving 2 g of sodium hydroxide (JIS K 8576) in a proportion of 8 mL of water is heated to 85° C. or more, a test material (for example, size 30×30 mm, and the surface on the opposite side to the surface to be measured is masked with tape in advance) is immersed until foaming due to the dissolution of plating stops, whereby the aluminum-based plating layer 2 can be dissolved. This method is a method that utilizes a property in which aluminum dissolves in an aqueous sodium hydroxide solution but the Al—Fe intermetallic compound layer containing Fe and the base material do not dissolve therein.

(Total Thickness of Aluminum-Based Plating Layer 2 and Intermetallic Compound Layer 3)

The thickness of the aluminum-based plating layer 2 is not particularly limited. For example, the total thickness of the aluminum-based plating layer 2 and the intermetallic compound layer 3 is preferably 10 µm or more and 40 µm or less. In a case where the total thickness of the aluminum-based plating layer 2 and the intermetallic compound layer 3 is 10 µm or more, the suppression of the generation of oxide scale in the base material 1 during heating in the hot stamping, and the suppression of corrosion after press forming during hot stamping can be sufficiently achieved. On the other hand, in a case where the total thickness of the aluminum-based plating layer 2 and the intermetallic compound layer 3 is 40 µm or less, the peeling of plating at a portion to which shear stress or compressive stress is applied during press forming during hot stamping is suppressed, whereby corrosion generated from a peeled portion can be further inhibited, and corrosion after the press forming can be further suppressed.

As a method of specifying the total thickness of the aluminum-based plating layer 2 and the intermetallic compound layer 3, for example, there is a method of observing and measuring a cross section of the aluminum-based plating layer 2 and the intermetallic compound layer 3 using an optical microscope or a scanning electron microscope (SEM).

As above, the aluminum-based plating layer 2 included in the aluminum-based plated steel sheet according to the present embodiment has been described in detail.

<Intermetallic Compound Layer 3>

In the present embodiment, the intermetallic compound layer 3 plays the most important role in improving the heating efficiency during heating in the hot stamping. Hereinafter, the intermetallic compound layer 3 will be described in detail.

(Elements of Intermetallic Compound Layer 3)

As described above, the intermetallic compound layer 3 is a layer that is located between the base material 1 and the aluminum-based plating layer 2 and contains an intermetallic compound of Al and Fe. The chemical composition of the intermetallic compound layer 3 is not particularly limited. This is because, when the chemical composition of the base material 1 and the chemical composition of the aluminum-based plating layer 2 are within the above range and the alloying treatment is performed so that the thickness of the intermetallic compound layer 3 is within the range described below, good characteristics can be obtained regardless of the chemical composition of the intermetallic compound layer 3. On average, the chemical composition of the intermetallic compound layer 3 usually contain 35 to 65 mass % of Al, 5 to 15 mass % of Si, and the remainder including Fe and impurities (when elements other than Al and Si are included in the aluminum-based plating layer 2, these elements are also included in the intermetallic compound layer 3), but is not limited thereto.

The intermetallic compound of Al and Fe is a concept including not only Fe—Al-based intermetallic compounds, but also intermetallic compounds containing elements other than Fe and Al, such as Fe—Al—Si-based intermetallic compounds. Examples of the Fe—Al-based intermetallic compounds include $Fe_3Al$, FeAl, ε phase (phase generated by peritectic reaction from FeAl phase and liquid phase), FeAl$_2$ (ζ), Fe$_2$Al$_5$ (η), FeAl$_3$ (θ), FeAl$_5$, and FeAl$_4$. Examples of the Fe—Al—Si based intermetallic compound include Al$_3$Fe$_3$Si$_2$ (τ$_1$), Al$_{12}$Fe$_5$Si$_5$ (τ$_2$), Al$_9$Fe$_5$Si$_5$ (τ$_3$), Al$_3$FeSi$_2$ (τ$_4$), Al$_{15}$Fe$_5$Si$_5$ (τ$_5$), and Al$_4$FeSi (τ$_5$). These intermetallic compounds are generally extremely full hard and have common characteristics in terms of having brittleness. In addition, it is considered that there is no particular difference between these phases even regarding the thermal characteristics during hot stamping. Therefore, in the aluminum-based plated steel sheet according to the present embodiment, the kind of the intermetallic compound of Al and Fe is not particularly limited. The composition of the intermetallic compound layer 3 is known.

As described above, since the intermetallic compound layer 3 is generally extremely full hard and has brittleness, in a case of working, cracks are generated and become fracture origins, and cracking of the aluminum-based plating layer 2 occurs at the origins. In severe cases, the intermetallic compound layer 3 may be cracked during skin pass rolling or leveling after plating or during blanking, and the aluminum-based plating layer 2 may come off.

Furthermore, the intermetallic compound layer 3 plays a very important role in the temperature rising rate of the heating in the hot stamping. During heating in the hot stamping, energization heating, near-infrared heating, far-infrared heating, radiant heating, and the like are used as heating methods. In particular, near-infrared heating, far-infrared heating, and radiant heating are often used because of their advantages of high industrial productivity and less restrictions on blank size. In any of these heating methods, the emissivity of the surface of the steel sheet greatly affects the temperature rising rate of heating. As a result of intensive studies, the present inventors have found that the intermetallic compound layer 3 is extremely important for increasing the emissivity of the surface of the steel sheet.

During heating in the hot stamping, Fe in the base material 1 (for example, in the vicinity of the surface of the base material 1) diffuses into the aluminum-based plating layer 2 in the intermetallic compound layer 3 with an increase in temperature. Therefore, while the thickness of the aluminum-based plating layer 2 having a high Al concentration decreases, the intermetallic compound layer 3 grows and increases in thickness. During heating in the hot stamping, finally, the intermetallic compound layer 3 is formed up to the outermost surface of the aluminum-based plating layer 2. It was found that the temperature rising rate during heating in the hot stamping was slow at from room temperature to about 750° C., and increased at 750° C. or more. It was also found that the temperature rising rate in a temperature range of 650° C. to 750° C. was the slowest. The cause of such a phenomenon is not clear but is estimated as follows from the fact that the temperature range of 650° C. to 750° C. where the temperature rising rate is particularly slow is close to 660° C., which is the melting point of metal Al. That is, although the emissivity of Al is originally low, it is considered that when the temperature reaches 650° C. to 750° C., the surface is smoothed due to the melting of Al, and the emissivity further decreases. In a temperature range of 750° C. or more, the intermetallic compound layer 3 made of an intermetallic compound of Al and Fe is formed up to the surface, so that the emissivity is improved. It is considered that the heat absorption efficiency changes with the change in the emissivity as described above and thus the temperature rising rate varies depending on the temperature range.

The fact that the emissivity is improved when an intermetallic compound of Al and Fe is formed indicates that regarding the external appearance of the surface of the aluminum-based plating layer 2, the external appearance of the surface before heating is silver-white with metallic luster, whereas when the intermetallic compound of Al and Fe is formed up to the surface of the aluminum-based plating layer 2, the external appearance of the surface changes to a blackish color and the metallic luster disappears. As described above, it was found that it is important to form the intermetallic compound of Al and Fe up to the surface of the aluminum-based plating layer 2 during heating in the hot stamping in order to improve the heating efficiency.

On the other hand, since the intermetallic compound layer is full hard as described above, when the intermetallic compound layer is formed in a large amount, fracture easily occurs, and a problem of plating adhesion occurs during forming in the hot stamping. Therefore, the present inventors conceived of forming locally thick portions in a certain proportion while suppressing an excessive increase in the average thickness of the intermetallic compound layer 3. Accordingly, the problem of plating adhesion can be solved. Furthermore, an intermetallic compound of Al and Fe can be formed up to the surface of the aluminum-based plating during heating in the hot stamping, and the heating efficiency can be promoted.

(Average Value of Thickness of Intermetallic Compound Layer 3: 2 μm or More and 10 μm or Less)

Based on the above idea, the average thickness of the intermetallic compound layer 3 is set to 2 μm or more and 10 μm or less. In a case where the average value of the thickness is less than 2 μm, it takes time for the intermetallic compound to grow to the surface during heating in the hot stamping, and a sufficient improvement in the temperature rising rate cannot be obtained. On the other hand, in a case where the average value of the thickness exceeds 10 μm, a problem of plating adhesion occurs at the time of skin pass rolling, leveler correction, blanking, and the like. The average value of the thickness of the intermetallic compound layer 3 is preferably 3 μm or more, 4 μm or more, or 5 μm or more. The average value of the thickness of the intermetallic compound layer 3 is preferably 10 μm or less, 9 μm or less, or 8 μm or less.

(Maximum Value of Thickness of Intermetallic Compound Layer 3: 10 μm or More and 25 μm or Less)

The maximum value of the thickness of the intermetallic compound layer 3 is set to 10 μm or more and 25 μm or less. In a case where the maximum value of the thickness is less than 10 μm, it takes time for the intermetallic compound to grow to the surface during heating in the hot stamping, and a sufficient improvement in the temperature rising rate cannot be obtained. On the other hand, in a case where the maximum value of the thickness exceeds 25 μm, a problem of plating adhesion occurs at the time of skin pass rolling, leveler correction, blanking, and the like. The maximum value of the thickness of the intermetallic compound layer 3 is preferably 10 μm or more, 12 μm or more, or 15 μm or more. The maximum value of the thickness of the intermetallic compound layer 3 is preferably 23 μm or less, 21 μm or less, or 18 μm or less.

(Standard Deviation of Thickness of Intermetallic Compound Layer 3: 2 μm or More and 10 μm or Less)

The standard deviation of the thickness of the intermetallic compound layer 3 is set to 2 μm or more and 10 μm or less. In a case where the standard deviation of the thickness is less than 2 μm, it takes time for the intermetallic compound to grow to the surface during heating in the hot stamping, and a sufficient improvement in the temperature rising rate cannot be obtained. On the other hand, in a case where the standard deviation of the thickness exceeds 10 µm, a problem of plating adhesion occurs at the time of skin pass rolling, leveler correction, blanking, and the like. The standard deviation of the thickness of the intermetallic compound layer 3 is preferably 2 µm or more, 3 µm or more, or 4 µm or more. The standard deviation of the thickness of the intermetallic compound layer 3 is preferably 9 µm or less, 8 µm or less, or 7 µm or less.

(Measurement Method and Calculation Method of Average Value, Maximum Value, and Standard Deviation of Thickness of Intermetallic Compound Layer 3)

Figure 3:
FIG. 3 is an example of a secondary electron image obtained by observing a cross section in the vicinity of the surface of the aluminum-based plated steel sheet according to the embodiment with a scanning electron microscope (SEM).

The average value, the maximum value, and the standard deviation of the thickness are measured in a cross section obtained by cutting an aluminum-based plated steel sheet in parallel with the thickness direction and appropriately performing preparation such as polishing. Specifically, a range in which the intermetallic compound layer 3 appears in the cross section is observed at a magnification of 300-fold using SEM. An image obtained by the SEM observation may be any of a secondary electron image and a reflection electron image. The base material, the intermetallic compound layer, and the aluminum-based plating layer of the aluminum-based plated steel sheet according to the present embodiment can be usually clearly distinguished by SEM observation as shown in FIG. 3. In a case where the interface between the base material, the intermetallic compound layer, and the aluminum-based plating layer cannot be clearly confirmed by the SEM observation, area analysis of plating elements is performed by EPMA to specify an intermetallic compound of Fe and Al. A region containing the intermetallic compound of Fe and Al is regarded as the intermetallic compound layer 3, a region primarily containing Al and not containing the intermetallic compound of Fe and Al is regarded as the aluminum-based plating layer 2, and a region primarily containing Fe and not containing the intermetallic compound of Fe and Al is regarded as the base material 1.

Figure 5:
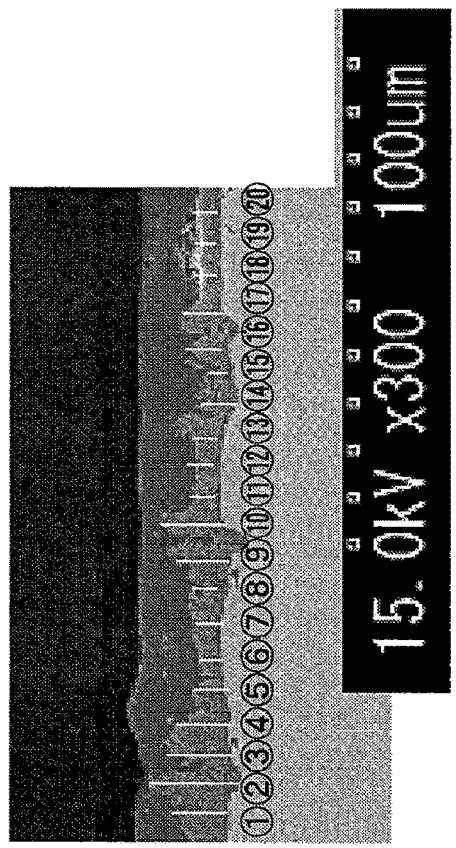
FIG. 5 shows an actual measurement example of the average value of a thickness, the maximum value of the thickness, and the standard deviation of the thickness at each point in an intermetallic compound layer of the aluminum-based plated steel sheet according to the embodiment, based on the secondary electron image of the cross section in the vicinity of the surface.

The thickness of the intermetallic compound layer 3 in the obtained observation photograph is measured at 20 points as shown in FIG. 5. The measurement is performed at equal intervals in the observation photograph, and the distance between the measurement points is set to 6.5 µm. In the aluminum-based plated steel sheet according to the present embodiment, the interface between the base material 1 and the intermetallic compound layer 3 and the interface between the intermetallic compound layer 3 and the aluminum-based plating layer 2 may usually have irregular shapes, and such irregular shapes need to be reflected in thickness measurement values at each measurement point.

Using thickness values $d_1$ to $d_{20}$ of the intermetallic compound layer 3 at each measurement point measured in the observation photograph, an average value, a maximum value, and a standard deviation of the thickness of the intermetallic compound layer 3 in the observation photograph can be obtained as follows. That is, the arithmetic average value $d_{AVE}$ of $d_1$ to $d_{20}$ is regarded as the average value of the thickness of the intermetallic compound layer 3 in the observation photograph. The largest value among $d_1$ to $d_{20}$ is regarded as the maximum value of the thickness of the intermetallic compound layer 3 in the observation photograph. The standard deviation of the thickness of the intermetallic compound layer 3 in the observation photograph is calculated according to the following formula.

$$S = \sqrt{\frac{1}{20}\sum_{i=1}^{20}(d_i - d_{AVE})^2} \qquad \text{[Formula 1]}$$

Here, s is the standard deviation of the thickness of the intermetallic compound layer 3, i is the measurement number (1 to 20), and $d_{AVE}$ is the arithmetic average value of $d_1$ to $d_{20}$ as described above. FIG. 5 is an example in which the average value, the maximum value, and the standard deviation of the thickness are actually measured for the intermetallic compound layer 3 according to the present embodiment.

As above, the intermetallic compound layer 3 included in the aluminum-based plated steel sheet according to the present embodiment has been described in detail.

<Oxide-Containing Region 4>

As schematically illustrated in FIG. 2, in the aluminum-based plated steel sheet according to the present embodiment, it is preferable that the oxide-containing region 4 is present in the vicinity of the interface between the base material 1 and the intermetallic compound layer 3 inside the base material 1. As a result of intensive studies by the present inventors, it was clarified that by providing the oxide-containing region 4, an intermetallic compound of Al and Fe is more effectively formed. Although the cause is not clear, it is considered that due to the presence of an oxide in the vicinity of the surface of the base material 1, the amount of solid solution of elements other than Fe in the vicinity of the surface of the base material 1 decreases, and the diffusion of Fe into the aluminum-based plating layer 2 is promoted. As the diffusion of Fe into the aluminum-based plating layer 2 is promoted, the time until the intermetallic compound of Al and Fe is formed on the surface of the aluminum-based plating layer 2 is shortened. As a result, the heating efficiency of the steel sheet is further improved (that is, the temperature rising rate is further improved).

(Presence Range of Oxide-Containing Region 4)

It is preferable that the oxide-containing region 4 is present within a range of 5 µm from the interface between the base material 1 and the intermetallic compound layer 3 in a direction toward the center of the thickness of the base material 1.

(Oxide Content)

The oxide-containing region 4 preferably contains at least one oxide of Si, Mn, Cr, and B in a total amount of 1 mass % or more and 10 mass % or less. By causing the total amount of such oxides to be 1% or more, the above-described effects can be reliably obtained. On the other hand, when the total amount of the oxides is caused to be 10 mass % or less, the diffusion of iron into the plating can be secured, and the heating efficiency can be kept higher. Furthermore, when the total amount of the oxides is caused to be 10 mass % or less, the plating adhesion can be kept higher. The total amount of the oxides is preferably 10 mass % or less.

(Method of Specifying Oxide Content)

The total amount of the above oxides can be specified as follows.

That is, in a cross section cut along the thickness direction of the steel sheet, 100 points within 5 µm from the interface between the base material 1 and the intermetallic compound layer 3 into the base material are analyzed by EPMA. The distance between the measurement points is set to 0.2 µm or more, and the measurement points need to be evenly dispersed in a region within 5 µm from the interface between the base material 1 and the intermetallic compound layer 3 into the base material. In the present specification, the total amount of the oxides is determined as follows. According to the EPMA analysis, at points where the intensities of Si, Mn, Cr, and B are three or more times the intensities thereof at a depth position of 30 μm from the interface between the base material 1 and the intermetallic compound layer 3 into the base material, the number of points where the concentration peak of oxygen (O) is also shown is counted. Then, the ratio obtained by dividing the obtained number of points by 100 is expressed as a percentage and regarded as the total amount of the oxides (here, expressed as mass %).

As described above, the oxide-containing region 4 provided in the aluminum-based plated steel sheet according to the present embodiment has been described.

[Method of Manufacturing Aluminum-Based Plated Steel Sheet]

Next, a method for manufacturing an aluminum-based plated steel sheet having excellent heating efficiency for hot stamping according to the embodiment of the present invention will be described in detail.

The method of manufacturing an aluminum-based plated steel sheet according to the present embodiment includes: hot rolling a steel slab to obtain a hot-rolled steel sheet; coiling the hot-rolled steel sheet; pickling the hot-rolled steel sheet; cold rolling the hot-rolled steel sheet to obtain a cold rolled steel sheet; and continuously performing an annealing treatment and a hot dip aluminum-based plating treatment on the cold rolled steel sheet. The composition of the steel slab includes: by mass %: C: 0.15% or more and 0.5% or less; Si: 0.01% or more and 2.0% or less; Mn: 0.3% or more and 5.0% or less; Cr: 0.01% or more and 2.0% or less; P: 0.1% or less; S: 0.1% or less; Al: 0.5% or less; B: 0.0002% or more and 0.01% or less; N: 0% or more and 0.01% or less; W: 0% or more and 3% or less; Mo: 0% or more and 3% or less; V: 0% or more and 2% or less; Ti: 0% or more and 0.5% or less; Nb: 0% or more and 1% or less; Ni: 0% or more and 5% or less; Cu: 0% or more and 3% or less; Sn: 0% or more and 0.1% or less; Sb: 0% or more and 0.1% or less, and the remainder including Fe and impurities. That is, the composition of the steel slab is equal to the composition of the base material 1. A preferable composition of the steel slab conforms to the preferable chemical composition of the base material 1 described above. Furthermore, in the method of manufacturing an aluminum-based plated steel sheet according to the present embodiment, a steel sheet coiling temperature CT during coiling is set to 700° C. or more and 850° C. or less, the arithmetic average roughness Ra of the surface of the cold rolled steel sheet after the cold rolling is set to 0.5 μm or more and 5 μm or less, and a plating bath in the hot dip aluminum-based plating treatment contains 80 mass % or more and 97 mass % or less of Al, 3 mass % or more and 15 mass % or less of Si, impurities, 0 mass % or more and 5 mass % or less of Zn, 0 mass % or more and 5 mass % or less of Fe, and 0 mass % or more and 3 mass % or less in total of one or more selected from the group consisting of Mg and Ca so that the total amount thereof is 100 mass %. In the method for manufacturing an aluminum-based plated steel sheet according to the present embodiment, in the annealing treatment, a value of a relational expression log $(P_{H2O}/P_{H2})$ between the water vapor partial pressure $P_{H2O}$ and the hydrogen partial pressure $P_{H2}$ in an annealing atmosphere in a sheet temperature range of 650° C. or more and 900° C. or less may be set to −3 or more and −0.5 or less, and an annealing time at the sheet temperature may be set to 60 seconds or more and 500 seconds or less. In the method of manufacturing an aluminum-based plated steel sheet according to the present embodiment, the plating bath may contain one or more selected from the group consisting of Mg and Ca in a total amount of 0.01 mass % or more and 3 mass % or less.

Hereinafter, more specific manufacturing conditions will be described in detail. According to the manufacturing method that satisfies the manufacturing conditions described below, the aluminum-based plated steel sheet according to the present embodiment can be suitably manufactured. However, as a matter of course, the method of manufacturing an aluminum-based plated steel sheet according to the present embodiment is not particularly limited. The aluminum-based plated steel sheet having the above-described configuration is regarded as the aluminum-based plated steel sheet according to the present embodiment regardless of the manufacturing conditions.

<Steel Making, Casting, Hot Rolling, and Coiling>

After adjusting the chemical composition of steel in a steel making process so as to satisfy the chemical composition of the base material 1 described above, the steel is formed into a slab by continuous casting. For the obtained slab (steel), hot rolling is started at a heating temperature of, for example, 1300° C. or less (for example, 1000° C. to 1300° C.), and hot rolling is completed at around 900° C. (for example, 850° C. to 950° C.), whereby a hot-rolled steel sheet is obtained. The hot rolling reduction may be, for example, 60% to 90%.

(Coiling Temperature CT of Hot-Rolled Steel Sheet after Hot Rolling Treatment)

The coiling temperature CT of the hot-rolled steel sheet after the hot rolling is one of the important conditions for the aluminum-based plated steel sheet for hot stamping having excellent heating efficiency. In general, the coiling temperature CT is preferably as low as about 500° C. to 600° C. for the purpose of suppressing carbides (deteriorating the ductility of the material) generated in the hot-rolled steel sheet during air cooling after coiling. However, the present inventors found that by setting the steel sheet coiling temperature CT to 700° C. or more, the average value, the maximum value, and the standard deviation of the thickness of the intermetallic compound layer 3 after the hot dip aluminum-based plating can be controlled to achieve excellent heating efficiency during heating in the hot stamping. The reason for this is not clear, but the present inventors presume as follows. That is, since the intermetallic compound 3 is formed by a reaction between Al as a plating element and Fe in the base material 1 during the hot dip aluminum-based plating treatment, the reactivity of Fe in the base material 1 is important for the generation of the intermetallic compound. Here, by setting the steel sheet coiling temperature CT to 700° C. or more, diffusion of elements other than Fe contained in the base material 1 to the surface of the base material can be promoted. Since the atmosphere of the hot rolling is the air, during the period between the hot rolling and the coiling, Fe scale is formed on the surface of the base material (hot-rolled steel sheet), and elements other than Fe that has reached the surface of the base material are also easily oxidized, so that a composite oxide scale of Fe and the elements other than Fe is formed, or a subscale or the like is formed at the interface between the Fe scale and the base material. All such scales are removed by the subsequent pickling, but the concentration of the elements other than Fe on the surface of the base material decreases and the Fe concentration relatively increases. It is considered that this promotes the diffusion of Fe into the aluminum-based plating in the hot dip aluminum-based plating treatment. Furthermore, since the decrease in the concentration of the elements other than Fe in the vicinity of the surface of the base material is particularly promoted at grain boundaries of Fe, the values of the maximum value and the standard deviation of the thickness of the intermetallic compound layer 3 can be increased. In addition, an effect of facilitating the diffusion of Fe in the base material 1 into the aluminum-based plating is also recognized, and the heating efficiency of the steel sheet during heating in the hot stamping is also excellent. As described above, although carbides are generated by increasing the coiling temperature, the carbides are melted by heating during hot stamping. Therefore, even though the steel sheet coiling temperature CT of the present application is set to 700° C. or more, the material after hot stamping, which is important as component characteristics, is not particularly deteriorated.

In order to obtain the above effects, the steel sheet coiling temperature CT is set to 700° C. or more. On the other hand, when the steel sheet coiling temperature CT exceeds 850° C., the average value, the maximum value, and the standard deviation of the thickness of the intermetallic compound layer 3 become excessively large, and it becomes difficult to secure the hot rolling temperature. Therefore, the upper limit of the steel sheet coiling temperature CT is set to 850° C. The steel sheet coiling temperature CT after the hot rolling is preferably 710° C. or more, or 720° C. or more. The steel sheet coiling temperature CT after the hot rolling is preferably 830° C. or less, Of 810° C. or less.

<Pickling Treatment>

The conditions of the pickling treatment of the hot-rolled steel sheet after the coiling are not particularly limited, and any method such as hydrochloric acid pickling and sulfuric acid pickling may be used. Since hydrochloric acid pickling is easier to maintain the decrease in the concentration of the elements other than Fe on the surface of the steel sheet than sulfuric acid pickling, hydrochloric acid pickling is preferred. Furthermore, by partially leaving the composite oxide scale of Fe and the elements other than Fe and the subscale generated at the interface between the Fe scale and the base material 1, an oxide-containing region may be formed inside the base material after the subsequent hot dip aluminum-based plating treatment. Therefore, the pickling time is preferably set to 600 seconds or less. However, in a case where the pickling time is shorter than 10 seconds, the Fe scale remains and non-plating is formed during the hot dip plating treatment, which is not practical. Therefore, the pickling time is preferably 10 seconds or more and 600 seconds or less. The pickling time is more preferably 20 seconds or more and 400 seconds or less.

<Cold Rolling>

(Cold Rolling Reduction and Surface Roughness of Cold Rolled Steel Sheet)

After the pickling, the hot-rolled steel sheet is cold rolled. The cold rolling reduction in the associated cold rolling can be, for example, 30% to 90%, and is preferably 40% or more and 70% or less.

In addition, it is considered that it is necessary to form unevenness by the cold rolling on the surface of the base material in which a portion of the alloying elements has been removed and the Fe concentration has been increased by applying the above-described coiling conditions. By increasing the surface roughness of the steel sheet after the cold rolling (that is, the cold rolled steel sheet), the contact surface area between the aluminum-based plating layer 2 and the base material 1 can be increased, so that the diffusion efficiency of Fe can be further improved. In addition, by causing the interface between the aluminum-based plating layer 2 and the base material 1 to be further irregular, the diffusion of Fe can be made more irregular, and the standard deviation of the thickness of the intermetallic compound layer can be increased. Actually, it could be seen that the unevenness of the thickness of the intermetallic compound layer does not simply follow the expected unevenness of the surface of the base material, and as illustrated in FIG. 3, the more the surface of the base material is depressed, the thicker the intermetallic compound layer becomes.

In order to obtain this effect, it is important to cause the surface roughness of the base material after the cold rolling to be an arithmetic average roughness Ra of 0.5 μm or more and 5 μm or less. By causing the arithmetic average roughness Ra of the surface to be 0.5 μm or more, the diffusion of Fe into the aluminum-based plating in the hot dip aluminum-based plating treatment is particularly locally promoted, and the values of the average value, the maximum value, and the standard deviation of the thickness of the intermetallic compound layer 3 are increased. Furthermore, when the arithmetic average roughness Ra is 0.5 μm or more, Fe is easily diffused into the aluminum-based plating layer 2 during heating in the hot stamping. As a result, alloying to the surface of the aluminum-based plating layer 2 can be achieved within a short period of time, so that the heating efficiency during heating in the hot stamping is improved. On the other hand, when the arithmetic average roughness Ra exceeds 5 μm, the thickness of the intermetallic compound layer 3 becomes excessively irregular, which causes damage to a hearth roll in an annealing furnace of a hot dip plating line in addition to a reduction in the formability during hot stamping. Therefore, the arithmetic average roughness Ra is set to 5 μm or less. The surface roughness (arithmetic average roughness Ra) of the steel sheet after the cold rolling is preferably 0.7 μm or more, or 0.9 μm or more. The surface roughness (arithmetic average roughness Ra) of the base material after the cold rolling is preferably 4 μm or less, or 3 μm or less.

The arithmetic average roughness of the surface of the base material can be controlled via the surface roughness of a roll for the cold rolling. In addition, the welding pressure applied to the roll and the speed at which the base material passes through the roll also affect the arithmetic average roughness of the surface of the base material, and thus can be used as control factors for the arithmetic average roughness of the surface of the base material.

By achieving both the surface roughness caused to be within the above range and the Fe concentration on the surface of the base material increased by causing the coiling temperature to be within the above range, all the average value, the maximum value, and the standard deviation of the thickness of the intermetallic compound layer finally obtained are preferably controlled. It is difficult to preferably manufacture an intermetallic compound layer only through optimization of either the coiling temperature or the surface roughness. For example, although it is possible to increase the standard deviation of the thickness of the intermetallic compound layer by increasing the coiling temperature beyond the above range, or by increasing the surface roughness beyond the above range, in this case, one or both of the average value and the maximum value of the thickness of the intermetallic compound layer become excessive. As the reason why the coiling temperature has a synergistic effect on the surface roughness of the base material, a possibility is considered that by increasing the coiling temperature, the surface of the base material may be decarburized and softened, and thus the effect of the surface roughness of the roll during subsequent cold rolling on the surface roughness of the base material may be promoted.

(Method of Measuring Arithmetic Average Roughness Ra)

The arithmetic average roughness Ra of the steel sheet after the cold rolling can be obtained by measuring the surface of the cold rolled steel sheet using a contact type surface roughness meter according to JIS B 0601 (2013) (a standard corresponding to ISO4287). In the present embodiment, the average value of values obtained by performing the above method five times is regarded as the arithmetic average roughness Ra of the steel sheet after the cold rolling.

<Annealing>

The cold rolled steel sheet obtained by the above treatment is continuously subjected to recrystallization annealing and the hot dip aluminum-based plating treatment in the hot dip plating line. For the annealing in the hot dip plating line, a total reducing furnace using radiant tube heating, or an oxidizing-reducing furnace equipped with an oxidation furnace heated by combustion gas, generally called a Sendzimir type annealing furnace, and a reducing furnace heated by radiant tube heating installed in parallel, is used, but the present embodiment is achieved with any kind of heating furnace. It is preferable that the maximum attainment sheet temperature in the annealing is preferably set to 700° C. or more and 900° C. or less. Furthermore, in a range where the sheet temperature is 650° C. or more and 900° C. or less in the annealing, it is preferable that the annealing atmosphere is set to an atmosphere in which the value of an oxygen potential expressed by the common logarithm log ($P_{H2O}/P_{H2}$) of the value obtained by dividing water vapor partial pressure $P_{H2O}$ by hydrogen partial pressure $P_{H2}$ is set to −3 or more and −0.5 or less, and an annealing time in the above range is set to 60 seconds or more and 500 seconds or less. For example, in a case where the maximum attainment temperature is set to 750° C., the temperature range for controlling the oxygen potential is preferably set to a sheet temperature range of 650° C. or more and 750° C. or less, and the annealing time in this temperature range is preferably set to 60 seconds or more and 500 seconds or less.

(Oxygen Potential)

In order to maintain a constant product quality, it is necessary to control the atmosphere in the furnace. The oxygen potential is sometimes used as an index of the atmosphere in the furnace, and the oxygen potential is represented by a relational expression log ($P_{H112O}/P_{H112}$) between the water vapor partial pressure $P_{H112O}$ and the hydrogen partial pressure $P_{H2}$ using a common logarithm. Here, $P_{H2O}$ is the water vapor partial pressure in the furnace, and $P_{H2}$ is the hydrogen partial pressure in the furnace. The oxidation state of the steel sheet can be controlled by the oxygen potential associated with the steel sheet temperature.

In the present embodiment, the value of the oxygen potential is preferably −3 or more and −0.5 or less in a sheet temperature range of 650° C. or more and 900° C. or less during annealing. In general, it is known that elements such as Si and Mn contained in a steel sheet form an oxide film on the surface of the steel sheet. Due to such an oxide film, the diffusion of Fe is inhibited during heating in the subsequent hot stamping. However, by causing the oxygen potential to be −3 or more, so-called internal oxidation occurs in which elements such as Si or Mn, Cr, and B are oxidized inside the steel sheet, so that formation of an oxide film on the surface of the steel sheet can be suppressed. Therefore, the oxygen potential is preferably −3 or more. On the other hand, when the oxygen potential exceeds−0.5, a large amount of oxides of Fe are generated, and the aluminum-based plating may spatter in pinhole shapes during the hot dip plating treatment after the annealing, causing non-plating. The value of the oxygen potential is more preferably −3 or more and −1 or less.

(Maximum Attainment Sheet Temperature and Annealing Time)

The maximum attainment sheet temperature in the annealing can be set to 700° C. or more and 900° C. or less as described above. In a case where the maximum attainment sheet temperature in the annealing is lower than 700° C., there is a possibility that the sheet temperature may be lower than the melting point of the hot dip aluminum-based plating bath, so that the adhesion of the hot dip aluminum-based plating may decrease, which is not preferable. In a case where the maximum attainment sheet temperature in the annealing exceeds 900° C., an oxide film of Si or Mn, which is an easily oxidizable element, is formed on the surface, and there may be cases where the adhesion of the hot dip aluminum-based plating is hindered and non-plating is formed in pinhole shapes, which is not preferable. In order to sufficiently promote internal oxidation of elements such as Si and Mn, the annealing time when the oxygen potential in a sheet temperature range of 650° C. or more and 900° C. or less is −3 to −0.5 is preferably 60 seconds or more. When the internal oxide is excessively generated, there is a high possibility that peeling may occur from a portion where the internal oxide is generated during press forming in hot stamping. Therefore, the annealing time when the oxygen potential is −3 to −0.5 in a sheet temperature range of 650° C. or more and 900° C. or less is preferably 500 seconds or less. The annealing time is more preferably 80 seconds or more and 400 seconds or less.

(Measurement Method)

In addition, the steel sheet temperature during annealing can be measured using a radiation-type thermometer disposed in advance in an annealing facility or a thermocouple attached to the steel sheet itself. In addition, the water vapor partial pressure $P_{112O}$ can be measured by a dew point meter disposed in advance in the annealing facility, and the hydrogen partial pressure $P_{H2}$ can be obtained by calculation from the ratio of the flow rate of hydrogen introduced to the flow rate of the total gas introduced into the annealing furnace. In general, the atmosphere introduced into the annealing furnace of the hot dip plating line is hydrogen and nitrogen, and the ratio of hydrogen is 1% or more and 20% or less.

<Aluminum-Based Plating Treatment>

(Adhesion Amount of Aluminum-Based Plating Layer)

After the above-described annealing, the steel sheet is continuously immersed in a molten aluminum bath during cooling, and the aluminum-based plating layer 2 is formed by controlling the adhesion amount of the aluminum-based plating solution by wiping. The adhesion amount of the aluminum-based plating layer 2 is not particularly limited, but is, for example, preferably 30 g/m$^2$ or more and 120 g/m$^2$ or less. In a case where the adhesion amount is less than 30 g/m$^2$, the corrosion resistance after hot stamping may be insufficient. On the other hand, in a case where the adhesion amount exceeds 120 g/m$^2$, during heating in the hot stamping, the time until Fe is sufficiently diffused becomes long, which may cause a problem of a decrease in productivity, and or a problem of peeling of the plating during forming of the hot stamping. The adhesion amount of the aluminum-based plating layer 2 is more preferably 40 g/m$^2$ or more. The adhesion amount of the aluminum-based plating layer 2 is more preferably 100 g/m$^2$ or less.

(Method of Measuring Adhesion Amount of Aluminum-Based Plating Layer)

As a method of specifying the adhesion amount of the aluminum-based plating layer 2, for example, there is a sodium hydroxide-hexamethylenetetramine/hydrochloric acid peeling weight method. Specifically, as described in JIS G 3314: 2011, a test piece having a predetermined area S (m$^2$) (for example, 50×50 mm) is prepared, and the weight w1 (g) is measured. Thereafter, the test piece is sequentially immersed in an aqueous solution of sodium hydroxide and an aqueous solution of hydrochloric acid to which hexamethylenetetramine is added, immersed until bubbles caused by dissolution of the plating stops, and then immediately washed with water, and the weight w2 (g) is measured again. At this time, the adhesion amount (g/m$^2$) of the aluminum-based plating can be obtained from (w1-w2)/S.

<Elements of Molten Aluminum Bath>

(Al: 80% or More and 97% or Less)

Regarding the elements of the molten aluminum bath, the Al content is set to 80 mass % or more. In a case where the Al content is less than 80%, the oxidation resistance deteriorates, and scale is generated during heating in the hot stamping. Furthermore, as described later, since the amount of Si in the molten aluminum bath is 3% or more, the Al content is 97% or less. The Al content in the molten aluminum bath is preferably 82% or more, or 84% or more. The Al content in the molten aluminum bath is preferably 95% or less, or 93% or less.

(Si: 3% or More and 15% or Less)

Si contained in the aluminum-based plating layer 2 affects the reaction between Al and Fe generated during heating in the hot stamping. When Al and Fe react excessively during heating in the hot stamping, the press formability of the aluminum-based plating layer 2 itself may be impaired. On the other hand, when such a reaction is excessively suppressed during heating in the hot stamping, adhesion of Al to the press die may be caused. In order to avoid such a problem, the Si content in the molten aluminum bath is set to 3% or more and 15% or less. The Si content in the molten aluminum bath is preferably 5% or more, or 7% or more. The Si content in the molten aluminum bath is preferably 13% or less, or 11% or less.

(Mg and Ca: 0% or More and 3% or Less in Total)

In order to increase the oxidation resistance of the aluminum-based plating layer 2, at least one of magnesium (Mg), calcium (Ca), strontium (Sr), and lithium (Li) can be contained. In particular, at least one of Mg and Ca is preferably contained in the molten aluminum bath in a total amount of 0.01% or more and 3% or less. In a case where the total amount of Mg and Ca is set to 0.01% or more, the effect of improving the oxidation resistance can be obtained. However, even though a plating bath that does not contain Mg and Ca is used, an aluminum-based plated steel sheet having excellent corrosion resistance and thermal properties can be manufactured, so that the total amount of Mg and Ca in the plating bath may be 0%. On the other hand, in a case where the total amount of Mg and Ca exceeds 3%, a problem of non-plating may occur during the hot dip plating treatment due to excessive generation of oxide. The total amount of Mg and Ca is more preferably 0.05% or more. The total amount of Mg and Ca is more preferably 1% or less.

Such a hot dip plating bath contains the above-mentioned elements and impurities so that the total amount thereof is 100 mass %. The impurities include Fe, Cr, Mo, V, W, Zn, and the like. In particular, the amount of each of Fe and Zn is preferably 5% or less.

As above, the method for manufacturing an aluminum-based plated steel sheet according to the present embodiment has been described in detail.

[Method of Manufacturing Component for Vehicle]

The aluminum-based plated steel sheet manufactured by the method described above is heated at 850° C. or more, and then formed by a hot stamping method in which rapid cooling is performed by a die at a cooling rate of 30° C./s or more, whereby a component for a vehicle can be manufactured. Hereinafter, a method of manufacturing a component for a vehicle will be briefly described.

(Hot Stamping Method)

The aluminum-based plated steel sheet obtained as described above has excellent heating efficiency in the hot stamping, and can realize a large temperature rising rate. Furthermore, the aluminum-based plating layer 2 of the above-described aluminum-based plated steel sheet becomes an alloy layer containing an intermetallic compound of Al and Fe up to the plating surface after heating in the hot stamping. The alloy layer contains 30% or more of Fe and 65% or less of Al.

(Hot Stamping Temperature)

Regarding a heating method during hot stamping, as described above, since the present application is a technology that improves the production speed by utilizing an increase in surface emissivity, furnace heating with a normal electric heater, or a heating method using radiant heat such as a far-infrared, mid-infrared, or near-infrared method can be used. The present application is not used in a heating method using Joule heating such as an energization heating method. In this heating, the maximum attainment sheet temperature is set to 850° C. or more. There are two reason for setting the maximum attainment sheet temperature to 850° C. or more as follows. The first reason is that by heating the steel sheet to the austenite region and then rapidly cooling the steel sheet, martensitic transformation is caused and high-strengthening of the base material is achieved. The second reason is that by causing Fe to sufficiently diffuse to the surface of the aluminum-based plated steel sheet, alloying of the aluminum-based plating layer 2 proceeds. The upper limit of the maximum attainment sheet temperature of the aluminum-based plated steel sheet during heating in hot stamping is not particularly limited, but is preferably 1050° C. or less from the viewpoint of the durability of a heater or a heating furnace body. The maximum attainment sheet temperature during heating in the hot stamping is more preferably 870° C. or more and 1000° C. or less.

(Hot-Stamping Forming and Cooling Rate)

Next, the aluminum-based plated steel sheet in a heated state is disposed, for example, between a pair of upper and lower forming dies, press-formed, and rapidly cooled during pressing, thereby being formed into a desired shape. By leaving and holding the aluminum-based plated steel sheet at the press bottom dead point for several seconds, quenching is performed by contact cooling with a forming die, and a high-strength component formed by the hot-stamping forming can be obtained. The cooling rate during cooling is set to 30° C./s or more in order to cause the base material to primarily have martensite. The cooling rate is a value obtained by dividing the difference between the start temperature of forced cooling using a die (that is, the sheet temperature of a material when the die and the material are first brought into contact with each other) and the finishing temperature (that is, the sheet temperature of the material when the die and the material are separated from each other) by the time for which the forced cooling is performed, and is a so-called average cooling rate. The upper limit of the cooling rate is not particularly limited, but may be set to, for example, 1000° C./s or less. The cooling rate is more preferably 50° C./s or more. The cooling rate is more preferably 500° C./s or less.

(Hardness of Base Material after Hot Stamping)

The steel sheet after the hot stamping needs to have high strength in order to be used as a component for a vehicle. In a steel material, the hardness and the tensile strength are in a substantially proportional relationship up to a Vickers hardness of about 600 Hv. For this reason, in the present invention, the hardness is increased by including elements associated with the hardenability in the composition as the elements of the steel sheet and then performing hardening by contact cooling with the forming die in the hot stamping. As a specific hardness, the Vickers hardness of the base material in a member after the hot stamping in a cross section corresponding to ¼ of the sheet thickness needs to be 300 Hv or more in a case of being measured with a load of 1 kg.

The cross section corresponding to ¼ of the sheet thickness of the base material means, when a sample is taken from a sheet thickness cross section parallel to a rolling direction of the base steel sheet as an observed section and the observed section is polished and subjected to nital etching, a cross section of a region at a depth of about ¼ of the thickness t of the steel sheet from the rolled surface of the steel sheet in the observed section. A ¼t portion of the steel sheet may be defined as a region between a plane at a depth of ⅛t and a plane at a depth of ⅜t from the rolled surface of the steel sheet.

(Finishing Treatment)

The formed component after the hot stamping becomes a final component (that is, a component for a vehicle) after finishing treatments such as welding, chemical conversion treatment, and electrodeposition coating. As the chemical conversion treatment, usually, a zinc phosphate-based chemical conversion treatment or a zirconium-based chemical conversion treatment is used. As the electrodeposition coating, usually, cationic electrodeposition coating is often used, and the film thickness is about 5 to 50 μm. After the electrodeposition coating, a coating such as an intermediate coating and a top coating may further be applied to improve the external appearance quality and corrosion resistance.

EXAMPLES

Hereinafter, the present invention will be described more specifically with reference to examples and comparative examples. The examples described below are merely examples, and the present invention is not limited to the following examples.

Example 1

A cold rolled steel sheet having a base material composition as shown in Table 1 was processed to a predetermined sheet thickness and used as a test material. The size of the test material is 240 mm×300 mm. These test materials were manufactured through normal hot rolling, pickling, and cold rolling in which the arithmetic average roughness Ra of the surface of the cold rolled steel sheet was caused to be 0.5 μm or more and 5 μm or less. First, a cold rolled steel sheet (sheet thickness: 1.4 mm) having a steel composition as shown in Table 1 below was used as a test material, and effects of the base material composition on wettability during a plating treatment, hot stamping formability, and hardness after hot stamping were verified. For the test materials, the steel sheet coiling temperature after hot rolling was adjusted to be 700° C. or more and 800° C. or less, and annealing and a hot dip aluminum-based plating treatment were continuously performed thereon in a Sendzimir type heating furnace, whereby an aluminum-based plated steel sheet was produced.

In the annealing, the annealing temperature of a reducing furnace (that is, the maximum attainment sheet temperature) was set to 750° C., the atmosphere of the reducing furnace was set such that the oxygen potential at a sheet temperature of 700° C. or more was −5 or more and −0.5 less, and the retention time in the oxygen potential range was set to 30 seconds or more and 500 seconds or less.

Regarding the plating bath composition, the Al content was 70% or more and 96% or less, the Si content was 3% or more and 15% or less, and the Fe content was 1% to 4%. The plating solution adhesion amount was adjusted by a gas wiping method so that the adhesion amount of the aluminum-based plating layer 2 was about 60 g/m$^2$ per one surface.

In a hot stamping, the aluminum-based plated steel sheet obtained as described above was heated to 900° C. in a radiant heating furnace, and immediately cooled with a die at a cooling rate of 50° C./s or more, whereby high strength components B1 to B48 shown in Table 2 below were obtained. The die used was a hat die, and the radius of curvature R of all R portions was 5 mm.

TABLE 1

| | Base material No. | Steel composition (mass %, remainder consists of Fe and impurities) | | | | | | | | |
|---|---|---|---|---|---|---|---|---|---|---|
| | | C | Si | Mn | Cr | P | S | Al | B | Other elements |
| Invention Example | A1 | 0.18 | 0.2 | 1.2 | 0.2 | 0.005 | 0.005 | 0.05 | 0.0021 | |
| | A2 | 0.23 | 0.2 | 1.2 | 0.2 | 0.005 | 0.005 | 0.05 | 0.0021 | |
| | A3 | 0.3 | 0.2 | 1.2 | 0.2 | 0.005 | 0.005 | 0.05 | 0.0021 | |
| | A4 | 0.45 | 0.2 | 1.2 | 0.2 | 0.005 | 0.005 | 0.05 | 0.0021 | |
| | A5 | 0.23 | 0.05 | 1.2 | 0.2 | 0.005 | 0.005 | 0.05 | 0.0021 | |
| | A6 | 0.23 | 0.5 | 1.2 | 0.2 | 0.005 | 0.005 | 0.05 | 0.0021 | |
| | A7 | 0.23 | 1 | 1.2 | 0.2 | 0.005 | 0.005 | 0.05 | 0.0021 | |
| | A8 | 0.23 | 1.5 | 1.2 | 0.2 | 0.005 | 0.005 | 0.05 | 0.0021 | |
| | A9 | 0.23 | 0.2 | 0.5 | 0.2 | 0.005 | 0.005 | 0.05 | 0.0021 | |
| | A10 | 0.23 | 0.2 | 1.6 | 0.2 | 0.005 | 0.005 | 0.05 | 0.0021 | |
| | A11 | 0.23 | 0.2 | 2.5 | 0.2 | 0.005 | 0.005 | 0.05 | 0.0021 | |
| | A12 | 0.23 | 0.2 | 4.5 | 0.2 | 0.005 | 0.005 | 0.05 | 0.0021 | |
| | A13 | 0.23 | 0.2 | 1.2 | 0.03 | 0.005 | 0.005 | 0.05 | 0.0021 | |
| | A14 | 0.23 | 0.2 | 1.2 | 0.6 | 0.005 | 0.005 | 0.05 | 0.0021 | |
| | A15 | 0.23 | 0.2 | 1.2 | 1.5 | 0.005 | 0.005 | 0.05 | 0.0021 | |
| | A16 | 0.23 | 0.2 | 1.2 | 0.2 | 0.002 | 0.005 | 0.05 | 0.0021 | |
| | A17 | 0.23 | 0.2 | 1.2 | 0.2 | 0.02 | 0.005 | 0.05 | 0.0021 | |

TABLE 1-continued

| | Base material No. | Steel composition (mass %, remainder consists of Fe and impurities) | | | | | | | |
|---|---|---|---|---|---|---|---|---|---|
| | | C | Si | Mn | Cr | P | S | Al | B | Other elements |
| | A18 | 0.23 | 0.2 | 1.2 | 0.2 | 0.08 | 0.005 | 0.05 | 0.0021 | |
| | A19 | 0.23 | 0.2 | 1.2 | 0.2 | 0.005 | 0.002 | 0.05 | 0.0021 | |
| | A20 | 0.23 | 0.2 | 1.2 | 0.2 | 0.005 | 0.02 | 0.05 | 0.0021 | |
| | A21 | 0.23 | 0.2 | 1.2 | 0.2 | 0.005 | 0.08 | 0.05 | 0.0021 | |
| | A22 | 0.23 | 0.2 | 1.2 | 0.2 | 0.005 | 0.005 | 0.03 | 0.0021 | |
| | A23 | 0.23 | 0.2 | 1.2 | 0.2 | 0.005 | 0.005 | 0.2 | 0.0021 | |
| | A24 | 0.23 | 0.2 | 1.2 | 0.2 | 0.005 | 0.005 | 0.4 | 0.0021 | |
| | A25 | 0.23 | 0.2 | 1.2 | 0.2 | 0.005 | 0.005 | 0.05 | 0.0008 | |
| | A26 | 0.23 | 0.2 | 1.2 | 0.2 | 0.005 | 0.005 | 0.05 | 0.0055 | |
| | A27 | 0.23 | 0.2 | 1.2 | 0.2 | 0.005 | 0.005 | 0.05 | 0.0085 | |
| | A28 | 0.23 | 0.2 | 1.2 | 0.2 | 0.005 | 0.005 | 0.05 | 0.0021 | Ti: 0.02 |
| | A29 | 0.23 | 0.2 | 1.2 | 0.2 | 0.005 | 0.005 | 0.05 | 0.0021 | Nb: 0.02 |
| | A30 | 0.23 | 0.2 | 1.2 | 0.2 | 0.005 | 0.005 | 0.05 | 0.0021 | Mo: 0.1 |
| | A31 | 0.23 | 0.2 | 1.2 | 0.2 | 0.005 | 0.005 | 0.05 | 0.0021 | V: 0.2 |
| | A32 | 0.23 | 0.2 | 1.2 | 0.2 | 0.005 | 0.005 | 0.05 | 0.0021 | Cu: 0.05 |
| | A33 | 0.23 | 0.2 | 1.2 | 0.2 | 0.005 | 0.005 | 0.05 | 0.0021 | Ni: 0.05 |
| | A34 | 0.23 | 0.2 | 1.2 | 0.2 | 0.005 | 0.005 | 0.05 | 0.0021 | Mo: 0.2, Nb: 0.05 |
| | A35 | 0.23 | 0.2 | 1.2 | 0.2 | 0.005 | 0.005 | 0.05 | 0.0021 | Ti: 0.03, Cu: 0.1 |
| | A36 | 0.23 | 0.2 | 1.2 | 0.2 | 0.005 | 0.005 | 0.05 | 0.0021 | N: 0.005 |
| | A37 | 0.23 | 0.2 | 1.2 | 0.2 | 0.005 | 0.005 | 0.05 | 0.0021 | Sn: 0.05 |
| | A38 | 0.23 | 0.2 | 1.2 | 0.2 | 0.005 | 0.005 | 0.05 | 0.0021 | Sb: 0.05 |
| | A39 | 0.23 | 0.2 | 1.2 | 0.2 | 0.005 | 0.005 | 0.05 | 0.0021 | W: 0.1 |
| Comparative Example | A40 | <u>0.08</u> | 0.2 | 1.2 | 0.2 | 0.005 | 0.005 | 0.05 | 0.0021 | |
| | A41 | <u>0.7</u> | 0.2 | 1.2 | 0.2 | 0.005 | 0.005 | 0.05 | 0.0021 | |
| | A42 | 0.15 | <u>0.005</u> | 1.2 | 0.2 | 0.005 | 0.005 | 0.05 | 0.0021 | |
| | A43 | 0.15 | <u>3</u> | 1.2 | 0.2 | 0.005 | 0.005 | 0.05 | 0.0021 | |
| | A44 | 0.15 | 0.2 | <u>0.2</u> | 0.2 | 0.005 | 0.005 | 0.05 | 0.0021 | |
| | A45 | 0.15 | 0.2 | <u>7</u> | 0.2 | 0.005 | 0.005 | 0.05 | 0.0021 | |
| | A46 | 0.23 | 0.2 | 1.2 | <u>0.005</u> | 0.005 | 0.005 | 0.05 | 0.0021 | |
| | A47 | 0.23 | 0.2 | 1.2 | <u>3</u> | 0.005 | 0.005 | 0.05 | 0.0021 | |
| | A48 | 0.23 | 0.2 | 1.2 | 0.2 | <u>0.3</u> | 0.005 | 0.05 | 0.0021 | |
| | A49 | 0.23 | 0.2 | 1.2 | 0.2 | 0.005 | <u>0.3</u> | 0.05 | 0.0021 | |
| | A50 | 0.23 | 0.2 | 1.2 | 0.2 | 0.005 | 0.005 | <u>1.5</u> | 0.0021 | |
| | A51 | 0.23 | 0.2 | 1.2 | 0.2 | 0.005 | 0.005 | 0.05 | <u>0.0001</u> | |
| | A52 | 0.23 | 0.2 | 1.2 | 0.2 | 0.005 | 0.005 | 0.05 | <u>0.03</u> | |

Table 2 shows the evaluation results of wettability during the plating treatment, hot stamping formability, and hardness after hot stamping.

The plating wettability was determined to be G (GOOD) when pinhole-shaped non-plating was not visually observed during the hot dip plating treatment, and was determined to be B (BAD) when non-plating was observed. The formability after hot stamping was determined to be G (GOOD) in a case where a cross section of the hat-shaped R portion was observed and the base material had no crack, and was determined to be B (BAD) in a case where the base material had cracks. The hardness of a cross section corresponding to ¼ of the sheet thickness of the base material after hot stamping was measured with a Vickers hardness tester, and 300 Hv (load 1 kg) or more was determined to be G (GOOD), and less than 300 Hv was determined to be B (BAD).

TABLE 2

| | Symbol | Base material No. | Plating wettability | Formability after hot stamping | Hardness after hot stamping |
|---|---|---|---|---|---|
| Invention Example | B1 | A1 | G | G | G |
| | B2 | A2 | G | G | G |
| | B3 | A3 | G | G | G |
| | B4 | A4 | G | G | G |
| | B5 | A5 | G | G | G |
| | B6 | A6 | G | G | G |
| | B7 | A7 | G | G | G |
| | B8 | A8 | G | G | G |
| | B9 | A9 | G | G | G |

TABLE 2-continued

| Symbol | Base material No. | Plating wettability | Formability after hot stamping | Hardness after hot stamping |
|---|---|---|---|---|
| B10 | A10 | G | G | G |
| B11 | A11 | G | G | G |
| B12 | A12 | G | G | G |
| B13 | A13 | G | G | G |
| B14 | A14 | G | G | G |
| B15 | A15 | G | G | G |
| B16 | A16 | G | G | G |
| B17 | A17 | G | G | G |
| B18 | A18 | G | G | G |
| B19 | A19 | G | G | G |
| B20 | A20 | G | G | G |
| B21 | A21 | G | G | G |
| B22 | A22 | G | G | G |
| B23 | A23 | G | G | G |
| B24 | A24 | G | G | G |
| B25 | A25 | G | G | G |
| B26 | A26 | G | G | G |
| B27 | A27 | G | G | G |
| B28 | A28 | G | G | G |
| B29 | A29 | G | G | G |
| B30 | A30 | G | G | G |
| B31 | A31 | G | G | G |
| B32 | A32 | G | G | G |
| B33 | A33 | G | G | G |
| B34 | A34 | G | G | G |
| B35 | A35 | G | G | G |
| B36 | A36 | G | G | G |
| B37 | A37 | G | G | G |
| B38 | A38 | G | G | G |
| B39 | A39 | G | G | G |

TABLE 2-continued

| Symbol | Base material No. | Plating wettability | Formability after hot stamping | Hardness after hot stamping |
|---|---|---|---|---|
| Comparative Example B40 | A40 | G | G | B |
| B41 | A41 | G | B | G |
| B42 | A42 | G | G | B |
| B43 | A43 | B | G | G |
| B44 | A44 | G | G | B |
| B45 | A45 | B | G | G |
| B46 | A46 | G | G | B |
| B47 | A47 | B | G | G |
| B48 | A48 | G | B | G |
| B49 | A49 | G | B | G |
| B50 | A50 | B | G | G |
| B51 | A51 | G | G | B |
| B52 | A52 | B | G | G |

As shown in Table 2, Examples B1 to B39 of the present invention using A1 to A39 shown in Table 1 as the base steel sheets were all G (GOOD) in terms of plating wettability after hot stamping, formability, and hardness. On the other hand, Comparative Examples B40 to B52 using A40 to A52 shown in Table 1 as the base steel sheets were B (BAD) in any of plating wettability, hot stamping formability, and hardness after hot stamping, and were unsuitable as high strength components for a vehicle.

Example 2

Next, effects of the composition of the aluminum-based plating layer 2, and the average value, the maximum value, and the standard deviation of the thickness of the Al—Fe intermetallic compound layer 3 on the heating efficiency during hot stamping, the presence or absence of Fe scale during hot stamping, and the corrosion resistance after hot stamping were verified. Furthermore, effects of the oxide content in a range of 5 μm from the interface between the base material 1 and the intermetallic compound 2 in a direction toward the center of the base material 1 and Mg and Ca in the aluminum-based plating layer on the heating efficiency during hot stamping, the presence or absence of Fe scale during hot stamping, and the corrosion resistance after hot stamping were verified.

Under the same conditions as in Example 1, aluminum-based plated steel sheets were produced using cold rolled steel sheets (sheet thickness 1.4 mm) having the steel composition shown in Table 1 as test materials, and formed articles were obtained by performing hot stamping under the same conditions as in Example 1. However, in Comparative Examples C23 and C24 in Table 3 below, the hot coiling temperature CT was set to 600° C. to 650° C. Furthermore, as shown in Table 5 below, for some invention examples (E1 to E9), at least one of Mg and Ca was further added to the plating bath composition in an amount of 0.01% or more and 3% or less. The remainder of the composition of the aluminum-based plating layer shown in Tables 3 to 5 consisted of Fe and impurities.

The results of analysis of the proportions of Al, Si, Mg, and Ca in the aluminum-based plating layer, the intermetallic compound layer of Al and Fe, and the oxide content on the surface of the base steel sheet in the invention examples of the present application are shown in Tables 3, 4, and 5. As described above, the proportions of Al, Si, Mg, and Ca in the aluminum-based plating layer 2 were determined by dissolving the plating layer and quantitatively analyzing the solution using ICP-atomic emission spectrometry. Regarding the intermetallic compound layer 3 made of an intermetallic compound of Al and Fe, as described above, a cross section of the aluminum-based plated steel sheet cut along the thickness direction was observed with a SEM, and the average value of the thickness, the maximum value of the thickness, and the standard deviation of the thickness were measured. An example of the measurement is as illustrated in FIG. 5, for example. The total amount of oxides in the range of 5 μm from the interface between the base material 1 and the intermetallic compound layer 3 in the direction toward the center of the base material 1 was obtained by analysis with EPMA as described above.

Regarding the produced samples, the heating efficiency during hot stamping, the Fe scale during hot stamping, and the corrosion resistance after hot stamping were evaluated.

(Evaluation of Heating Efficiency During Hot Stamping)

A K-type thermocouple was attached to the center of a sample having a size of 240 mm×300 mm of the aluminum-based plated steel sheet obtained by the above method, and the temperature was measured during heating in the hot stamping. The average value of the change in temperature from 100° C. to 880° C. measured by being put into a radiation heating type heating furnace was calculated, and the heating efficiency was evaluated. In Tables 3 to 5 shown below, among comparative examples having the same sheet thickness and basis weight as the invention example, with respect to Level C23, a case where the temperature rising rate was improved by 1.3 or more times was regarded as VG (VERY GOOD), a case where the temperature rising rate was improved by 1.2 or more times and less than 1.3 times was regarded as G (GOOD), and a case where the temperature rising rate was less than 1.1 times and was hardly changed was regarded as B (BAD).

When the temperature rising rate is improved by 1.2 or more times, the heating time or the length of the heating furnace in a temperature rising section is reduced by about 0.8 times or less. The improvement of the heating efficiency, that is, the value of 1.2 times, is a very significant value from the viewpoint of the cost of facilities, operating energy, operating cost, space saving of facilities, productivity such as environmental ($CO_2$) properties, and running cost in the field of actual production.

(Presence or Absence of Fe Scale During Hot Stamping)

The surface of an R portion of a hat formed portion obtained by hot stamping was analyzed by EPMA. In Tables 3 to 5, a case where an oxygen intensity of 10 mass % or more was detected was regarded as Fe scale present and described as B (BAD), and a case where the amount of oxygen detected was less than 10 mass % was regarded as Fe scale absent and described as G (GOOD).

(Corrosion Resistance of Formed Article after Hot Stamping)

A hat formed article obtained by hot stamping was used as a test piece, and the test piece was subjected to a chemical conversion treatment and corrosion-resistant coating. A corrosion test was performed using a test piece having a metal surface exposed by scratching the coating film on a flange portion of the test piece. Specifically, the chemical conversion treatment was performed with a chemical conversion solution PB-SX35 manufactured by Nihon Parkerizing Co., Ltd., and then a cationic electrodeposition paint POWERNICS 110 manufactured by NIPPONPAINT Co., Ltd. was applied to a thickness of about 20 μm. Thereafter, a cross-cut was made on the coating film on the flange portion with a cutter, and a composite corrosion test (JASO M610-92) defined by the Society of Automotive Engineers of Japan, Inc. was performed for 180 cycles (60 days) to measure the reduction amount of the sheet thickness of the cross-cut portion. At this time, when the reduction amount exceeded the sheet thickness reduction depth of a galvannealed steel sheet GA (adhesion amount 45 g/m² on one side), the corrosion resistance was regarded as B (BAD), when the reduction amount was lower than the sheet thickness reduction depth, the corrosion resistance was regarded as G (GOOD), and when the reduction amount was suppressed to ⅔ or less, the corrosion resistance was regarded as VG (VERY GOOD).

Table 3 below shows the results of the above evaluation items when the composition of the aluminum-based plating layer 2 and the average value, the maximum value, and the standard deviation of the thickness of the Al—Fe intermetallic compound layer 3 were changed. As is clear from Table 3, Comparative Examples C21 to C24 did not satisfy the present embodiment in one or more of the composition of the aluminum-based plating layer 2, and the average value of the thickness, the maximum value of the thickness, and the standard deviation of the thickness of the intermetallic compound layer 3. Comparative Examples C21 to C24 were inferior in any of the heating efficiency during hot stamping, the generation of Fe scale during hot stamping, and the corrosion resistance of high strength components after hot stamping. On the other hand, Invention Examples C1 to C20 of the present application were good in all the evaluation items.

TABLE 3

| | Level | Base material No. | Aluminum-based plating layer Al content (%) | Aluminum-based plating layer Si content (%) | Intermetallic compound layer Average value of thickness (µm) | Intermetallic compound layer Maximum value of thickness (µm) | Intermetallic compound layer Standard deviation of thickness (µm) | Heating efficiency during hot stamping | Fe scale during hot stamping | Corrosion resistance of formed article after hot stamping |
|---|---|---|---|---|---|---|---|---|---|---|
| Invention Example | C1 | A1 | 82 | 15 | 2 | 13 | 4 | G | G | G |
| | C2 | A2 | 87 | 10 | 4 | 17 | 4 | G | G | G |
| | C3 | A3 | 89 | 8 | 6 | 18 | 4 | G | G | G |
| | C4 | A4 | 92 | 5 | 7 | 20 | 4 | G | G | G |
| | C5 | A5 | 94 | 3 | 8 | 25 | 4 | G | G | G |
| | C6 | A6 | 87 | 10 | 2 | 17 | 4 | G | G | G |
| | C7 | A7 | 87 | 10 | 4 | 17 | 4 | G | G | G |
| | C8 | A8 | 87 | 10 | 6 | 17 | 4 | G | G | G |
| | C9 | A9 | 87 | 10 | 7 | 17 | 4 | G | G | G |
| | C10 | A10 | 87 | 10 | 8 | 17 | 4 | G | G | G |
| | C11 | A11 | 87 | 10 | 7 | 11 | 4 | G | G | G |
| | C12 | A12 | 87 | 10 | 7 | 15 | 4 | G | G | G |
| | C13 | A13 | 87 | 10 | 7 | 18 | 4 | G | G | G |
| | C14 | A14 | 87 | 10 | 7 | 20 | 4 | G | G | G |
| | C15 | A15 | 87 | 10 | 7 | 22 | 4 | G | G | G |
| | C16 | A16 | 87 | 10 | 7 | 11 | 3 | G | G | G |
| | C17 | A17 | 87 | 10 | 7 | 17 | 5 | G | G | G |
| | C18 | A18 | 87 | 10 | 7 | 19 | 7 | G | G | G |
| | C19 | A19 | 87 | 10 | 7 | 20 | 8 | G | G | G |
| | C20 | A20 | 87 | 10 | 7 | 22 | 9 | G | G | G |
| Comparative Example | C21 | A2 | 99 | 1 | 12 | 26 | 20 | G | B | B |
| | C22 | A2 | 77 | 20 | 2 | 7 | 1 | B | G | G |
| | C23 | A2 | 87 | 10 | 4 | 10 | 1 | B | G | G |
| | C24 | A2 | 87 | 10 | 3 | 8 | 1 | B | G | G |

Table 4 below shows the results of the above evaluation items when the total amount of oxides in the range of 5 µm from the interface between the base material 1 and the intermetallic compound 2 in the direction toward the center of the base material 1 was changed. As shown in Table 4, the heating efficiency during hot stamping of Invention Examples D1 to D4 of the present application containing a total of 1% to 10% of oxides on the surface of the base steel sheet was superior.

TABLE 4

| | Level | Base material No. | Aluminum-based plating layer Al content (%) | Aluminum-based plating layer Si content (%) | Intermetallic compound layer Average value of thickness (µm) | Intermetallic compound layer Maximum value of thickness (µm) | Intermetallic compound layer Standard deviation of thickness (µm) | Oxygen content on surface of base steel sheet (%) | Heating efficiency during hot stamping | Fe scale during hot stamping | Corrosion resistance of formed article after hot stamping |
|---|---|---|---|---|---|---|---|---|---|---|---|
| Invention Example | D1 | A6 | 87 | 10 | 5 | 13 | 4 | 2 | VG | G | G |
| | D2 | A6 | 87 | 10 | 5 | 14 | 5 | 4 | VG | G | G |
| | D3 | A6 | 87 | 10 | 7 | 14 | 7 | 6 | VG | G | G |
| | D4 | A6 | 87 | 10 | 7 | 17 | 9 | 8 | VG | G | G |
| | D5 | A6 | 87 | 10 | 4 | 13 | 4 | 0 | G | G | G |

TABLE 4-continued

| | Level | Base material No. | Aluminum-based plating layer | | Intermetallic compound layer | | | Oxygen content on surface of base steel sheet (%) | Heating efficiency during hot stamping | Fe scale during hot stamping | Corrosion resistance of formed article after hot stamping |
| | | | Al content (%) | Si content (%) | Average value of thickness (μm) | Maximum value of thickness (μm) | Standard deviation of thickness (μm) | | | | |
|---|---|---|---|---|---|---|---|---|---|---|---|
| Comparative Example | D6 | A6 | 87 | 10 | <u>12</u> | 22 | <u>12</u> | 15 | VG | B | B |

As shown in Table 5 below, the heating efficiency during hot stamping and the corrosion resistance after hot stamping of Invention Examples E1 to E9 of the present application in which one or more of Mg and Ca were contained in the aluminum-based plating layer 2 in a total amount of 0.01% to 3% were all superior. In addition, since E11 and E12 which are comparative examples contain Mg and Ca excessively, there was non-plating during hot dip plating, and evaluation was impossible.

TABLE 5

| | Level | Base material No. | Aluminum-based plating layer | | | Intermetallic compound layer | | | Oxygen content on surface of base steel sheet (%) | Heating efficiency during hot stamping | Fe scale during hot stamping | Corrosion resistance of formed article after hot stamping |
| | | | Al content (%) | Si content (%) | Mg and Ca content (%) | Average value of thickness (μm) | Maximum value of thickness (μm) | Standard deviation of thickness (μm) | | | | |
|---|---|---|---|---|---|---|---|---|---|---|---|---|
| Invention Example | E1 | A10 | 86.95 | 10 | Mg: 0.05 | 4 | 13 | 4 | 0 | VG | G | VG |
| | E2 | A10 | 86.8 | 10 | Mg: 0.2 | 4 | 14 | 4 | 0 | VG | G | VG |
| | E3 | A10 | 85 | 10 | Mg: 2 | 5 | 13 | 4 | 0 | VG | G | VG |
| | E4 | A10 | 86.95 | 10 | Ca: 0.05 | 4 | 13 | 5 | 0 | VG | G | VG |
| | E5 | A10 | 86.8 | 10 | Ca: 0.2 | 5 | 15 | 4 | 0 | VG | G | VG |
| | E6 | A10 | 85 | 10 | Ca: 2 | 4 | 13 | 4 | 0 | VG | G | VG |
| | E7 | A10 | 85 | 10 | Mg: 1, Ca: 1 | 4 | 14 | 5 | 0 | VG | G | VG |
| | E8 | A10 | 86.8 | 10 | Mg: 0.2 | 7 | 18 | 8 | 8 | VG | G | VG |
| | E9 | A10 | 86.8 | 10 | Ca: 0.2 | 7 | 17 | 9 | 8 | VG | G | VG |
| | E10 | A10 | 87 | 10 | Mg: 0, Ca: 0 | 4 | 13 | 4 | 0 | G | G | G |
| Comparative Example | E11 | A10 | 82 | 5 | <u>Mg: 10</u> | — | — | — | — | Could not be evaluated due to presence of non-plating | | |
| | E12 | A10 | 87 | 5 | <u>Ca: 5</u> | — | — | — | — | Could not be evaluated due to presence of non-plating | | |

Example 3

Next, the effects of the steel sheet coiling temperature CT in the hot rolling, the surface roughness Ra of the steel sheet after the cold rolling, and the composition of the hot dip aluminum-based plating bath on the heating efficiency during hot stamping, the presence or absence of Fe scale during hot stamping, and the corrosion resistance of hot-stamping formed articles was also verified. Furthermore, when the annealing atmosphere and at least one of Mg and Ca are contained in the aluminum-based plating layer, the effects on the heating efficiency at the time of hot stamping, the presence or absence of Fe scale at the time of hot stamping, and the corrosion resistance of a hot-stamping formed article were verified.

The steel slab having the steel composition shown in Table 1 was subjected to a normal hot rolling treatment, a pickling treatment, and a cold rolling treatment under the conditions shown in Tables 6 to 8, whereby a cold rolled steel sheet (sheet thickness 1.5 mm) was produced. Using this cold rolled steel sheet as a test material, annealing and a hot dip aluminum-based plating treatment were continuously performed in a Sendzimir type heating furnace, whereby an aluminum-based plated steel sheet was produced. In the annealing, the annealing temperature (that is, the maximum attainment sheet temperature) was 800° C., and the annealing atmosphere was achieved by changing the common logarithm log $(P_{H2O}/P_{H2})$ (that is, the oxygen potential) of a value obtained by dividing the water vapor partial pressure $P_{H112O}$ by the hydrogen partial pressure $P_{H2}$ at a sheet temperature of 700° C.

Regarding the aluminum-based plating treatment, the plating adhesion amount was adjusted to be about 80 g/m² per one side by gas wiping after plating. The temperature of the aluminum-based plated steel sheet during hot stamping was set to 900° C., and die cooling was immediately performed at a cooling rate of 50° C./s or more, whereby a sample of the formed article was obtained.

For the prepared sample, in the same manner as in Example 2, the heating efficiency during hot stamping, the presence or absence of Fe scale during hot stamping, and the corrosion resistance of the formed article after hot stamping were evaluated.

Regarding the heating efficiency during hot stamping, with respect to Level F21 in Tables 6 to 8, a case where the temperature rising rate was improved by 1.3 or more times was regarded as VG (VERY GOOD), a case where the temperature rising rate was improved by 1.2 or more times was regarded as G (GOOD), and a case where the temperature rising rate was less than 1.1 times and was hardly changed was regarded as B (BAD).

TABLE 6

| | Level | Base material No. | Hot rolling coiling temperature CT (° C.) | Surface roughness Ra after cold rolling (μm) | Hot dip aluminum plating bath composition Al content (%) | Hot dip aluminum plating bath composition Si content (%) | Aluminum-based plating layer Al content (%) | Aluminum-based plating layer Si content (%) |
|---|---|---|---|---|---|---|---|---|
| Invention Example | F1 | A21 | 705 | 1 | 87 | 10 | 87 | 10 |
| | F2 | A22 | 735 | 1.5 | 87 | 10 | 87 | 10 |
| | F3 | A23 | 765 | 1.5 | 87 | 10 | 87 | 10 |
| | F4 | A24 | 795 | 2 | 87 | 10 | 87 | 10 |
| | F5 | A25 | 825 | 2.5 | 87 | 10 | 87 | 10 |
| | F6 | A26 | 750 | 2 | 87 | 10 | 87 | 10 |
| | F7 | A27 | 750 | 2.5 | 87 | 10 | 87 | 10 |
| | F8 | A28 | 750 | 3 | 87 | 10 | 87 | 10 |
| | F9 | A29 | 750 | 3.5 | 87 | 10 | 87 | 10 |
| | F10 | A30 | 750 | 4 | 87 | 10 | 87 | 10 |
| | F11 | A31 | 750 | 4.5 | 87 | 10 | 87 | 10 |
| | F12 | A32 | 750 | 1.5 | 93 | 4 | 93 | 4 |
| | F13 | A33 | 750 | 1.5 | 91 | 6 | 91 | 6 |
| | F14 | A34 | 750 | 1.5 | 89 | 8 | 89 | 8 |
| | F15 | A35 | 750 | 1.5 | 85 | 12 | 85 | 12 |
| | F16 | A1 | 750 | 1.5 | 83 | 14 | 83 | 14 |
| | F17 | A36 | 750 | 1.5 | 87 | 10 | 87 | 10 |
| | F18 | A37 | 750 | 1.5 | 87 | 10 | 87 | 10 |
| | F19 | A38 | 750 | 1.5 | 87 | 10 | 87 | 10 |
| | F20 | A39 | 750 | 1.5 | 87 | 10 | 87 | 10 |
| Comparative Example | F21 | A2 | 600 | 0.3 | 89 | 8 | 87 | 10 |
| | F22 | A2 | 600 | 1 | 89 | 8 | 87 | 10 |
| | F23 | A2 | 650 | 1 | 89 | 8 | 87 | 10 |
| | F24 | A2 | 870 | 4 | 89 | 8 | 87 | 10 |
| | F25 | A2 | 720 | 0.3 | 89 | 8 | 87 | 10 |
| | F26 | A2 | 790 | 6 | 89 | 8 | 87 | 10 |
| | F27 | A2 | 750 | 1.5 | 99 | 1 | 99 | 1 |
| | F28 | A2 | 750 | 1.5 | 77 | 20 | 77 | 20 |

| | Level | Intermetallic compound layer Average value of thickness (μm) | Intermetallic compound layer Maximum value of thickness (μm) | Intermetallic compound layer Standard deviation of thickness (μm) | Heating efficiency during hot stamping | Fe scale during hot stamping | Corrosion resistance of formed article after hot stamping |
|---|---|---|---|---|---|---|---|
| Invention Example | F1 | 4 | 11. | 3 | G | G | G |
| | F2 | 5 | 14 | 4 | G | G | G |
| | F3 | 7 | 17 | 4 | G | G | G |
| | F4 | 7 | 20 | 5 | G | G | G |
| | F5 | 8 | 22 | 6 | G | G | G |
| | F6 | 7 | 15 | 4 | G | G | G |
| | F7 | 7 | 17 | 4 | G | G | G |
| | F8 | 7 | 18 | 6 | G | G | G |
| | F9 | 7 | 20 | 7 | G | G | G |
| | F10 | 7 | 22 | 7 | G | G | G |
| | F11 | 7 | 24 | 8 | G | G | G |
| | F12 | 9 | 19 | 8 | G | G | G |
| | F13 | 8 | 17 | 6 | G | G | G |
| | F14 | 5 | 14 | 3 | G | G | G |
| | F15 | 4 | 14 | 2 | G | G | G |
| | F16 | 4 | 12 | 2 | G | G | G |
| | F17 | 4 | 13 | 2 | G | G | G |
| | F18 | 4 | 13 | 3 | G | G | G |
| | F19 | 5 | 13 | 2 | G | G | G |
| | F20 | 4 | 12 | 2 | G | G | G |
| Comparative Example | F21 | 4 | 7 | 1 | B | G | G |
| | F22 | 4 | 7 | 1 | B | G | G |
| | F23 | 4 | 7 | 1 | B | G | G |
| | F24 | 8 | 32 | 12 | G | B | B |
| | F25 | 4 | 8 | 1 | B | G | G |
| | F26 | 7 | 35 | 13 | G | B | B |
| | F27 | 12 | 7 | 1 | G | B | B |
| | F28 | 1 | 3 | 4 | B | G | G |

Comparative Examples F21 to F28 shown in Table 6 are comparative examples that did not satisfy the present invention ranges in one or more of the hot rolling coiling temperature CT, the surface roughness Ra after cold rolling, and the bath composition of the hot dip aluminum-based plating. All of Comparative Examples F21 to F28 were inferior in any of the heating efficiency during hot stamping, the generation of Fe scale during hot stamping, and the corrosion resistance after hot stamping. On the other hand, Invention Examples F1 to F20 satisfying the invention ranges of the present application were good in all the above evaluation items.

TABLE 7

| | Level | Base material No | Hot rolling coiling temperature CT (° C.) | Surface roughness Ra after cold rolling (μm) | Annealing atmosphere log ($P_{H2O}/P_{H2}$) | Annealing time (sec) | Hot dip aluminum plating bath composition Al content (%) | Si content (%) | Aluminum-based plating layer Al content (%) | Si content (%) |
|---|---|---|---|---|---|---|---|---|---|---|
| Invention Example | G1 | A7 | 780 | 2 | −2.5 | 100 | 87 | 10 | 87 | 10 |
| | G2 | A7 | 780 | 2 | −2 | 100 | 87 | 10 | 87 | 10 |
| | G3 | A7 | 780 | 2 | −1.5 | 100 | 87 | 10 | 87 | 10 |
| | G4 | A7 | 780 | 2 | −1 | 100 | 87 | 10 | 87 | 10 |
| | G5 | A7 | 780 | 2 | −1 | 70 | 87 | 10 | 87 | 10 |
| | G6 | A7 | 780 | 2 | −1 | 150 | 87 | 10 | 87 | 10 |
| | G7 | A7 | 780 | 2 | −1 | 250 | 87 | 10 | 87 | 10 |
| | G8 | A7 | 780 | 2 | −1 | 350 | 87 | 10 | 87 | 10 |
| | G9 | A7 | 780 | 2 | −1 | 450 | 87 | 10 | 87 | 10 |
| | G10 | A7 | 780 | 2 | −6 | 30 | 87 | 10 | 87 | 10 |
| | G11 | A7 | 780 | 2 | −0.3 | 600 | 87 | 10 | 87 | 10 |

| | Level | Intermetallic compound layer Average value of thickness (μm) | Maximum value of thickness (μm) | Standard deviation of thickness (μm) | Oxygen content on surface of base steel sheet (%) | Heating efficiency during hot stamping | Fe scale during hot stamping | Corrosion resistance after hot stamping |
|---|---|---|---|---|---|---|---|---|
| Invention Example | G1 | 6 | 15 | 5 | 2 | VG | G | G |
| | G2 | 6 | 16 | 5 | 2 | VG | G | G |
| | G3 | 7 | 16 | 6 | 4 | VG | G | G |
| | G4 | 8 | 17 | 6 | 6 | VG | G | G |
| | G5 | 8 | 16 | 6 | 5 | VG | G | G |
| | G6 | 8 | 17 | 7 | 6 | VG | G | G |
| | G7 | 8 | 18 | 7 | 7 | VG | G | G |
| | G8 | 9 | 20 | 8 | 8 | VG | G | G |
| | G9 | 9 | 22 | 9 | 8 | VG | G | G |
| | G10 | 5 | 15 | 5 | 0 | G | G | G |
| | G11 | 9 | 23 | 9 | 13 | G | G | G |

As shown in Table 7, Invention Examples G1 to G9 of the present application in which the common logarithm log ($P_{H2O}/P_{H2}$) (that is, the oxygen potential) of the value obtained by dividing the water vapor partial pressure $P_{H2O}$ by the hydrogen partial pressure $P_{H2}$ in the annealing atmosphere was set to −3 or more and −0.5 or less, and the annealing time in the range was set to 30 seconds or more and 500 seconds or less were superior in the heating efficiency during hot stamping.

TABLE 8

| | Level | Base material No. | Hot rolling coiling temperature CT (° C.) | Surface roughness Ra after cold rolling (μm) | Annealing atmosphere log ($P_{H2O}/P_{H2}$) | Annealing time (sec) | Hot dip aluminum plating bath composition Al content (%) | Si content (%) | Mg and Ca content (%) | Aluminum-based plating layer Al content (%) |
|---|---|---|---|---|---|---|---|---|---|---|
| Invention Example | H1 | A15 | 780 | 2 | −4 | 100 | 86.95 | 10 | Mg: 0.05 | 86.95 |
| | H2 | A15 | 780 | 2 | −4 | 100 | 86.8 | 10 | Mg: 0.2 | 86.8 |
| | H3 | A15 | 780 | 2 | −4 | 100 | 87 | 10 | Mg: 2 | 87 |
| | H4 | A15 | 780 | 2 | −4 | 100 | 86.95 | 10 | Ca: 0.05 | 86.95 |
| | H5 | A15 | 780 | 2 | −4 | 100 | 86.8 | 10 | Mg: 0.1, Ca: 0.1 | 86.8 |
| | H6 | A15 | 780 | 2 | −1 | 250 | 86.8 | 10 | Mg: 0.1, Ca: 0.1 | 86.8 |
| | H7 | A15 | 780 | 2 | −1 | 250 | 86 | 10 | Mg: 0.5, Ca: 0.5 | 86 |
| | H8 | A15 | 780 | 2 | −4 | 100 | 87 | 10 | Mg: 0, Ca: 0 | 87 |
| Comparative Example | H9 | A15 | 780 | 2 | −4 | 100 | 75 | 10 | Mg: 15 | 75 |
| | H10 | A15 | 780 | 2 | −4 | 100 | 94.5 | 0.5 | Ca: 5 | 94.5 |

TABLE 8-continued

| | | Aluminum-based plating layer | | Intermetallic compound layer | | | Oxygen content on surface of base steel sheet (%) | Heating efficiency during hot stamping | Fe scale during hot stamping | Corrosion resistance after hot stamping |
|---|---|---|---|---|---|---|---|---|---|---|
| | Level | Si content (%) | Mg and Ca content (%) | Average value of thickness (μm) | Maximum value of thickness (μm) | Standard deviation of thickness (μm) | | | | |
| Invention Example | H1 | 10 | Mg: 0.05 | 4 | 12 | 3 | 0 | VG | G | VG |
| | H2 | 10 | Mg: 0.2 | 5 | 11 | 4 | 0 | VG | G | VG |
| | H3 | 10 | Mg: 2 | 4 | 12 | 4 | 0 | VG | G | VG |
| | H4 | 10 | Ca: 0.05 | 5 | 11 | 3 | 0 | VG | G | VG |
| | H5 | 10 | Mg: 0.1, Ca: 0.1 | 4 | 12 | 3 | 0 | VG | G | VG |
| | H6 | 10 | Mg: 0.1, Ca: 0.1 | 7 | 18 | 7 | 7 | VG | G | VG |
| | H7 | 10 | Mg: 0.5, Ca: 0.5 | 7 | 17 | 7 | 7 | VG | G | VG |
| | H8 | 10 | Mg: 0, Ca: 0 | 4 | 12 | 3 | 0 | G | G | G |
| Comparative Example | H9 | 10 | Mg: 15 | — | — | — | — | Could not be evaluated due to presence of non-plating | | |
| | H10 | 0.5 | Ca: 5 | — | — | — | — | Could not be evaluated due to presence of non-plating | | |

As shown in Table 8, in the case of Invention Examples H1 to H7 in which at least one or more of Mg and Ca were contained in the bath of the hot dip aluminum-based plating in a total amount of 0.01% or more and 3% or less, the heating efficiency during hot stamping and the corrosion resistance after hot stamping were superior. However, Comparative Examples H9 and H10 excessively contained Mg and Ca and caused non-plating, so that evaluation was impossible.

Figure 4:
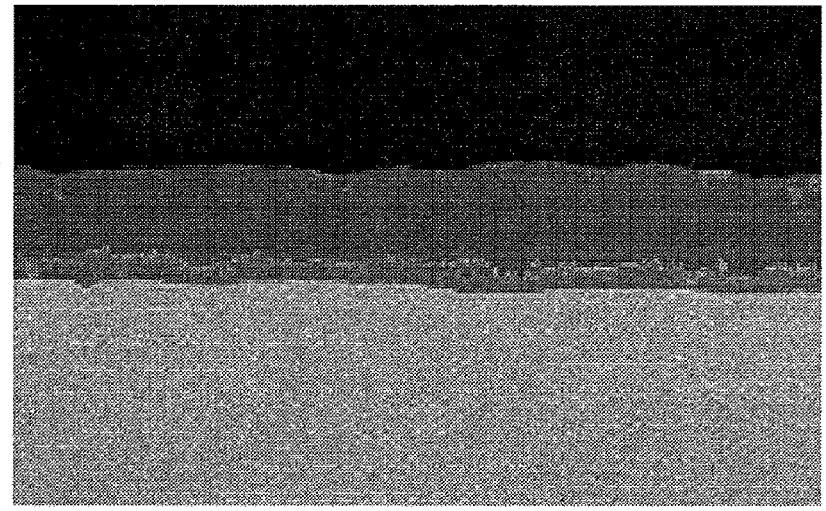
FIG. 4 is an example of a secondary electron image obtained by observing a cross section in the vicinity of the surface of an aluminum-based plated steel sheet in the related art by SEM.

FIG. 3 shows an example in which the aluminum-based plating layer 2 of F3 in Table 6 which is an example of the present invention was observed by SEM. FIG. 4 shows an example in which the aluminum-based plating layer 2 of F21 in Table 6 as a comparative example was observed by SEM. It can be seen that the maximum value and the standard deviation of the thickness of the intermetallic compound layer 3 of FIG. 3 which is an example of the present invention are clearly different from those of FIG. 4 and are large. FIG. 5 is an example in which the average value, the maximum value, and the standard deviation of the thickness of the intermetallic compound layer 3 in FIG. 3 were actually measured. As described above, the present invention with FIG. 3 as an invention example is excellent in all the heating efficiency during heating in the hot stamping, the ability to suppress Fe scale during hot stamping, and the corrosion resistance after hot stamping.

While the preferred embodiments of the present invention have been described above with reference to the accompanying drawings, it goes without saying that the present invention is not limited to such examples. It is obvious that those skilled in the art can conceive various changes or modifications within the scope of the claims, and it is understood that these naturally belong to the technical scope of the present invention.

BRIEF DESCRIPTION OF THE REFERENCE SYMBOLS 1 base material
2 aluminum-based plating layer
3 intermetallic compound layer
4 oxide-containing region

The invention claimed is:

1. An aluminum-based plated steel sheet comprising:
a base material;
an aluminum-based plating layer located above the base material; and
an intermetallic compound layer that is located between the base material and the aluminum-based plating layer and contains an intermetallic compound of Al and Fe,
wherein the base material contains, by mass %,
  C: 0.15% or more and 0.50% or less,
  Si: 0.010% or more and 2.000% or less,
  Mn: 0.3% or more and 5.0% or less,
  Cr: 0.010% or more and 2.000% or less,
  P: 0.1% or less,
  S: 0.1% or less,
  Al: 0.5% or less,
  B: 0.0002% or more and 0.0100% or less,
  N: 0% or more and 0.01% or less,
  W: 0% or more and 3% or less,
  Mo: 0% or more and 3% or less,
  V: 0% or more and 2% or less,
  Ti: 0% or more and 0.5% or less,
  Nb: 0% or more and 1% or less,
  Ni: 0% or more and 5% or less,
  Cu: 0% or more and 3% or less,
  Sn: 0% or more and 0.1% or less,
  Sb: 0% or more and 0.1% or less, and
  a remainder including Fe and impurities,
the aluminum-based plating layer contains, on average,
  80 mass % or more and 97 mass % or less of Al,
  3 mass % or more and 15 mass % or less of Si,
  0 mass % or more and 5 mass % or less of Zn,
  0 mass % or more and 5 mass % or less of Fe,
  0 mass % or more and 3 mass % or less in total of one or more selected from the group consisting of Mg and Ca, and
  impurities
  so that a total amount thereof is 100 mass %,
an average value of a thickness of the intermetallic compound layer is 2 μm or more and 10 μm or less,
a maximum value of the thickness of the intermetallic compound layer is 11 μm or more and 25 μm or less, and
a standard deviation of the thickness of the intermetallic compound layer is 2 μm or more and 10 μm or less.

2. The aluminum-based plated steel sheet according to claim 1 comprising:
an oxide-containing region that contains one or more selected from the group consisting of a Si oxide, a Mn oxide, a Cr oxide, and a B oxide in a total amount of 1 mass % or more and 10 mass % or less, in a range of 5 μm from an interface between the base material and the intermetallic compound layer in a direction toward a center of the base material.

3. The aluminum-based plated steel sheet according to claim 2,
wherein the aluminum-based plating layer contains one or more selected from the group consisting of Mg and Ca in a total amount of 0.01 mass % or more and 3 mass % or less.

4. A method of manufacturing the aluminum-based plated steel sheet according to claim 3, the method comprising:
hot rolling a steel slab to obtain a hot-rolled steel sheet;
coiling the hot-rolled steel sheet;
pickling the hot-rolled steel sheet;
cold rolling the hot-rolled steel sheet to obtain a cold rolled steel sheet; and
continuously performing an annealing treatment and a hot dip aluminum-based plating treatment on the cold rolled steel sheet,
wherein the steel slab contains, by mass %,
C: 0.15% or more and 0.50% or less,
Si: 0.010% or more and 2.000% or less,
Mn: 0.3% or more and 5.0% or less,
Cr: 0.010% or more and 2.000% or less,
P: 0.1% or less,
S: 0.1% or less,
Al: 0.5% or less,
B: 0.0002% or more and 0.0100% or less,
N: 0% or more and 0.01% or less,
W: 0% or more and 3% or less,
Mo: 0% or more and 3% or less,
V: 0% or more and 2% or less,
Ti: 0% or more and 0.5% or less,
Nb: 0% or more and 1% or less,
Ni: 0% or more and 5% or less,
Cu: 0% or more and 3% or less,
Sn: 0% or more and 0.1% or less,
Sb: 0% or more and 0.1% or less, and
a remainder including Fe and impurities,
a steel sheet coiling temperature CT during the coiling is set to 700° C. or more and 850° C. or less,
an arithmetic average roughness Ra of a surface of the cold rolled steel sheet after the cold rolling is set to 0.5 μm or more and 5 μm or less, and
a plating bath in the hot dip aluminum-based plating treatment contains
80 mass % or more and 97 mass % or less of Al,
3 mass % or more and 15 mass % or less of Si,
impurities,
0 mass % or more and 5 mass % or less of Zn,
0 mass % or more and 5 mass % or less of Fe, and
0 mass % or more and 3 mass % or less in total of one or more selected from the group consisting of Mg and Ca
so that a total amount thereof is 100 mass %.

5. A method of manufacturing a component for a vehicle, comprising:
heating the aluminum-based plated steel sheet according to claim 3 to 850° C. or more;
press forming the aluminum-based plated steel sheet with a die; and
rapidly cooling the aluminum-based plated steel sheet with the die at a cooling rate of 30° C./s or more.

6. The aluminum-based plated steel sheet according to claim 1,
wherein the aluminum-based plating layer contains one or more selected from the group consisting of Mg and Ca in a total amount of 0.01 mass % or more and 3 mass % or less.

7. A method of manufacturing a component for a vehicle, comprising:
heating the aluminum-based plated steel sheet according to any one of claims 1 to 6 to 850° C. or more;
press forming the aluminum-based plated steel sheet with a die; and
rapidly cooling the aluminum-based plated steel sheet with the die at a cooling rate of 30° C./s or more.

8. A method of manufacturing the aluminum-based plated steel sheet according to any one of claims 1 to 6, the method comprising:
hot rolling a steel slab to obtain a hot-rolled steel sheet;
coiling the hot-rolled steel sheet;
pickling the hot-rolled steel sheet;
cold rolling the hot-rolled steel sheet to obtain a cold rolled steel sheet; and
continuously performing an annealing treatment and a hot dip aluminum-based plating treatment on the cold rolled steel sheet,
wherein the steel slab contains, by mass %,
C: 0.15% or more and 0.50% or less,
Si: 0.010% or more and 2.000% or less,
Mn: 0.3% or more and 5.0% or less,
Cr: 0.010% or more and 2.000% or less,
P: 0.1% or less,
S: 0.1% or less,
Al: 0.5% or less,
B: 0.0002% or more and 0.0100% or less,
N: 0% or more and 0.01% or less,
W: 0% or more and 3% or less,
Mo: 0% or more and 3% or less,
V: 0% or more and 2% or less,
Ti: 0% or more and 0.5% or less,
Nb: 0% or more and 1% or less,
Ni: 0% or more and 5% or less,
Cu: 0% or more and 3% or less,
Sn: 0% or more and 0.1% or less,
Sb: 0% or more and 0.1% or less, and
a remainder including Fe and impurities,
a steel sheet coiling temperature CT during the coiling is set to 700° C. or more and 850° C. or less,
an arithmetic average roughness Ra of a surface of the cold rolled steel sheet after the cold rolling is set to 0.5 μm or more and 5 μm or less, and
a plating bath in the hot dip aluminum-based plating treatment contains
80 mass % or more and 97 mass % or less of Al,
3 mass % or more and 15 mass % or less of Si,
impurities,
0 mass % or more and 5 mass % or less of Zn,
0 mass % or more and 5 mass % or less of Fe, and
0 mass % or more and 3 mass % or less in total of one or more selected from the group consisting of Mg and Ca
so that a total amount thereof is 100 mass %.

9. The method of manufacturing the aluminum-based plated steel sheet according to claim 8,
wherein, in the annealing treatment, a value of a relational expression log $(P_{H2O}/P_{H2})$ between a water vapor partial pressure $P_{H2O}$ and a hydrogen partial pressure $P_{H2}$ in an annealing atmosphere in a sheet temperature range of 650° C. or more and 900° C. or less is set to −3 or more and −0.5 or less, and an annealing time at the sheet temperature is set to 60 seconds or more and 500 seconds or less.

10. The method of manufacturing the aluminum-based plated steel sheet according to claim 8, wherein the plating bath contains one or more selected from the group consisting of Mg and Ca in a total amount of 0.01 mass % or more and 3 mass % or less.

11. The method of manufacturing the aluminum-based plated steel sheet according to claim 9, wherein the plating bath contains one or more selected from the group consisting of Mg and Ca in a total amount of 0.01 mass % or more and 3 mass % or less.

* * * * *